United States Patent
Hazani et al.

(10) Patent No.: US 10,652,817 B2
(45) Date of Patent: *May 12, 2020

(54) COMBINING POWER FROM ELECTRICALLY ISOLATED POWER PATHS FOR POWERING REMOTE UNITS IN A DISTRIBUTED ANTENNA SYSTEM(S) (DASS)

(71) Applicant: Corning Optical Communications LLC, Hickory, NC (US)

(72) Inventors: Ami Hazani, Ra'anana (IL); Shlomo Zilberman, Shoham (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,765

(22) Filed: Apr. 12, 2019

(65) Prior Publication Data
US 2019/0239159 A1   Aug. 1, 2019

Related U.S. Application Data

(63) Continuation of application No. 15/795,682, filed on Oct. 27, 2017, now Pat. No. 10,292,096, which is a
(Continued)

(51) Int. Cl.
*H04W 52/00* (2009.01)
*G05F 3/08* (2006.01)
(Continued)

(52) U.S. Cl.
CPC .............. *H04W 52/00* (2013.01); *G05F 3/08* (2013.01); *H02J 4/00* (2013.01); *H04L 12/10* (2013.01);
(Continued)

(58) Field of Classification Search
CPC . H04W 52/00; H04W 88/085; H04W 72/044; H02J 4/00; H04L 12/10; H04L 12/40045; G05F 3/08
See application file for complete search history.

(56) References Cited

U.S. PATENT DOCUMENTS 9,785,175 B2 * 10/2017 Hazani ...................... G05F 3/08
10,292,096 B2 * 5/2019 Hazani ...................... G05F 3/08
(Continued)

OTHER PUBLICATIONS

Author Unknown, "Fiber Optic Distributed Antenna System" Installation and Users Guide, ERAU Version 1.5, May 2002, Andrews Corporation, 53 pgs.
(Continued)

*Primary Examiner* — Mohamed A Kamara
(74) *Attorney, Agent, or Firm* — C. Keith Montgomery

(57) ABSTRACT

Embodiments disclosed herein include combining power from isolated power paths for powering remote units in distributed antenna systems (DASs). In one example, a remote unit(s) is configured to include multiple input power ports for receiving power from multiple power paths. The received power from each input power port is combined to provide a combined output power for powering the remote unit. Thus, a remote unit can be powered by the combined output power. To avoid differences in received power on the multiple input power ports causing a power supply to supply higher power than designed or regulated, the input power ports in the remote unit are electrically isolated from each other. Further, the received power on the multiple power inputs ports can be controlled to be proportionally provided to the combined output power according to the maximum power supplying capabilities of the respective power supplies.

18 Claims, 11 Drawing Sheets

Related U.S. Application Data continuation of application No. 15/585,688, filed on May 3, 2017, now Pat. No. 9,813,982, which is a continuation of application No. 14/961,098, filed on Dec. 7, 2015, now Pat. No. 9,785,175.

(60) Provisional application No. 62/139,137, filed on Mar. 27, 2015.

(51) Int. Cl.
*H04W 72/04* (2009.01)
*H04L 12/10* (2006.01)
*H04W 88/08* (2009.01)
*H02J 4/00* (2006.01)
*H04L 12/40* (2006.01)

(52) U.S. Cl.
CPC ....... *H04W 72/044* (2013.01); *H04W 88/085* (2013.01); *H04L 12/40045* (2013.01)

(56) References Cited

U.S. PATENT DOCUMENTS

| | | |
|---|---|---|
| 2005/0197094 A1 | 9/2005 | Darshan et al. |
| 2005/0262364 A1 | 11/2005 | Diab et al. |
| 2010/0240302 A1 | 9/2010 | Buczkiewicz et al. |
| 2011/0241425 A1 | 10/2011 | Hunter, Jr. et al. |
| 2011/0260939 A1 | 10/2011 | Korva et al. |
| 2012/0317426 A1 | 12/2012 | Hunter, Jr. et al. |
| 2012/0319916 A1 | 12/2012 | Gears et al. |
| 2013/0046469 A1 | 2/2013 | Herron et al. |
| 2013/0249292 A1 | 9/2013 | Blackwell, Jr. et al. |
| 2013/0260706 A1 | 10/2013 | Singh |
| 2013/0330086 A1 | 12/2013 | Berlin et al. |
| 2014/0146692 A1 | 5/2014 | Hazani et al. |
| 2015/0082066 A1 | 3/2015 | Bose et al. |
| 2015/0380928 A1 | 12/2015 | Saig et al. |

OTHER PUBLICATIONS

International Search Report and Written Opinion PCT/IL2016/050306 dated Jun. 8, 2016.
Advisory Action for U.S. Appl. No. 13/687,457 dated May 24, 2017, 7 pgs.
Non-Final Office Action for U.S. Appl. No. 15/156,556 dated Apr. 11, 2017, 13 pgs.
Notice of Allowance and Examiner-initiated Interview Summary for U.S. Appl. No. 14/845,946 dated Apr. 20, 2017, 10 pgs.
Notice of Allowance for U.S. Appl. No. 14/845,929 dated May 9, 2017, 7 pgs.

* cited by examiner

COMBINING POWER FROM ELECTRICALLY ISOLATED POWER PATHS FOR POWERING REMOTE UNITS IN A DISTRIBUTED ANTENNA SYSTEM(S) (DASS)

CROSS-REFERENCE TO RELATED APPLICATION

This application is a continuation of 15/795,682, filed Oct. 27, 2017, which is a continuation of U.S. application Ser. No. 15/585,688, filed May 3, 2017, now U.S. Pat. No. 9,813,982, which is a continuation of U.S. application Ser. No. 14/961,098, filed Dec. 7, 2015, now U.S. Pat. No. 9,785,175, which claims the benefit of priority under 35 U.S.C. § 119 of U.S. Provisional App. No. 62/139,137 filed on Mar. 27, 2015, the content of both are relied upon and incorporated herein by reference in their entireties.

BACKGROUND

The technology of the present disclosure relates generally to combining power from electrically isolated power paths for powering remote units in distributed antenna systems (DASs).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 100(1)-100(N) of a DAS 102, wherein 'N' is the number of coverage areas. These communications services can include cellular services, wireless services such as RFID tracking, Wireless Fidelity (WiFi), local area network (LAN), WLAN, and combinations thereof, as examples. The coverage areas 100(1)-100(N) may be remotely located. In this regard, the remote coverage areas 100(1)-100(N) are created by and centered on remote units 104(1)-104(N) connected to a central unit 106 (e.g., a head-end controller or head-end unit). The central unit 106 may be communicatively coupled to a base station 108. If the DAS 102 is a broadband DAS, the central unit 106 receives downlink communications signals 110D in multiple frequency bands for different communications services from the base station 108 to be distributed to the remote units 104(1)-104(N). The remote units 104(1)-104(N) are configured to receive downlink communications signals 110D from the central unit 106 over a communications medium 112 to be distributed as downlink communications signals 110D to the respective coverage areas 100(1)-100(N) of the remote units 104(1)-104(N). Each remote unit 104(1)-104(N) may include an RF transmitter/receiver (not shown) and a respective antenna 114(1)-114(N) operably connected to the RF transmitter/receiver to wirelessly distribute the communications services to client devices 116 within their respective coverage areas 100(1)-100(N). The remote units 104(1)-104(N) are also configured to receive uplink communications signals 110U in multiple frequency bands over antennas 114(1)-114(N) from the client devices 116 in their respective coverage areas 100(1)-100(N) to be distributed over the communications medium 112 to the central unit 106.

Power is provided from one or more power sources to the remote units 104(1)-104(N) in the DAS 102 to provide power for the power-consuming components in the remote units 104(1)-104(N). For example, the remote units 104(1)-104(N) may receive power P over long wire electrical conductor pairs 118 ("wire pair 118") provided in the communications medium 112 from one or more power sources 120 ("power source 120"). For example, the power source 130 may be remote to the remote units 104(1)-104(N) and provided at the central unit 106 or other location in the DAS 102. The power source 120 may be either an alternative current (AC) or direct current (DC) power supply. Each wire pair 118 may carry a limited amount of current or voltage, which may be dictated by safety regulations or by physical properties of the wire pairs 118, such as their diameter and length. However, in some cases, one or more of the remote units 104(1)-104(N) may require more power than can be carried by a single wire pair 118. For example, NEC (National Electrical Code) Class 2 directives may limit the power that can be provided by a single power supply to 100 VA (Volt-Ampere).

One solution to deliver more power to the remote units 104(1)-104(N) is to connect multiple wire pairs 118 from multiple power output ports 122(1)-122(X) to each remote unit 104(1)-104(N). In this arrangement, each wire pair 118 provides power up to its limited power level. However, the power provided by all wire pairs 118 can be combined in parallel to provide a greater combined power to a remote unit 104(1)-104(N). However, the voltages at the end of each wire pair 118 may be different due to different voltage drop on the wires, differences in the adjustment of the power supply 120, and/or differences in components' tolerances in the power output ports 122(1)-122(X) of the power supply 120. If the voltages at the end of each wire pair 118 are not equal, this will cause the power supply 120 to distribute different current and thus different power P on power output ports 122(1)-122 (X) to a remote unit 104(1)-104(N). In such case, some power output ports 122(1)-122 (X) will deliver lower power while the other power output ports 122(1)-122 (X) will deliver higher power. If power P pulled by the power supply 120 reaches the limit allowed by safety regulations or capabilities for a given power output port(s) 122(1)-122(X), the power supply 120 may shut down thereby interrupting power P to the remote units 104(1)-104 (N).

No admission is made that any reference cited herein constitutes prior art. Applicant expressly reserves the right to challenge the accuracy and pertinency of any cited documents.

SUMMARY

Embodiments disclosed herein include combining of power from electrically isolated power paths for powering remote units in distributed antenna systems (DASs). In this regard, in one example, one or more remote units in a DAS include multiple input power ports for receiving power from multiple power paths. Each power path is capable of distributing a given maximum power based on its respective power supply and the power handling capability of the respective power path. The received power from each input power port in a remote unit is combined to provide a combined output power for powering the remote unit. In this manner, the remote unit can be powered by the combined output power if the remote unit requires more power for operation than can be supplied over a single power path. To avoid differences in received power on the multiple input power ports causing a power supply from providing higher power than designed or regulated, the input power ports in the remote unit are electrically isolated from each other. Further, in some embodiments, to provide for the received power on the multiple power inputs ports to be proportionally provided in the combined power according to the maximum power supplying capabilities of the respective power supplies, a controller is provided. The controller is configured to selectively control the amount of power provided from each power input port to the combined output power, based on the determined available power on each multiple input power port.

By proportionally combining power from electrically isolated power paths in a remote unit based on the power supplying capability of the respective power supplies, the remote unit can tolerate inaccuracies in the output power from the power supplies. For example, the type and length of wires used in the power paths for delivering power to the power input ports of a remote unit can cause the remote unit to draw power beyond the limits or regulations of a given power supply. This can simplify installation procedures for power supplies and remote units in a DAS, because in-field calibrations of power supplies by technicians based on variations in power supplies and power paths may be avoided. The remote unit can work with multiple types of power supplies, which can have different power delivery capabilities or regulations.

One embodiment of the disclosure relates to a remote unit for a distributed antenna system (DAS). The remote unit comprises a plurality of internal power paths each configured to carry power to a combined power node coupled to at least one remote unit load to provide a combined output power to the at least one remote unit load. The remote unit also comprises a plurality of input power ports provided in a respective internal power path among the plurality of internal power paths, each input power port among the plurality of input power ports configured to receive input power from a respective external power path in a DAS. The remote unit also comprises a plurality of isolation circuits provided in a respective internal power path among the plurality of internal power paths. Each isolation circuit among the plurality of isolation circuits is configured to receive the input power from the respective input power port and provide an electrically isolated output power based on the received input power at the combined power node to provide the combined output power. The remote unit also comprises a plurality of control circuits provided between the combined power node and the plurality of isolation circuits in a respective internal power path among the plurality of internal power paths to control the electrically isolated output power provided to the combined power node. The remote unit also comprises a controller configured to selectively control the plurality of control circuits to control the electrically isolated output power delivered from each isolation circuit in the respective internal power path to the combined power node into the combined output power.

Another embodiment of the disclosure relates to a method of combining power received from multiple input ports in a remote unit for a DAS. The method comprises receiving input power from a plurality of external power paths in a DAS into a plurality of input power ports each provided in a respective internal power path among a plurality of internal power paths. The method also comprises providing a plurality of electrically isolated output powers based on the received input power from a respective input power port among the plurality of input power ports. The method also comprises selectively controlling an amount of electrically isolated output power delivered in each respective internal power path, to a combined power node into a combined output power to be provided to at least one remote unit load.

Another embodiment of the disclosure relates to a DAS. The DAS comprises a central unit. The central unit is configured to distribute at least one downlink communications signal over at least one communications medium to at least one remote unit among a plurality of remote units. The central unit is also configured to receive at least one uplink communications signal over the at least one communications medium from at least one remote unit among the plurality of remote units. Each of the plurality of remote units is configured to receive the at least one downlink communications signal over the at least one communications medium from the central unit and distribute the received at least one downlink communications signal from the central unit to at least one client device. Each of the plurality of remote units is also configured to receive the at least one uplink communications signal from the at least one client device and distribute the received at least one uplink communications signal over the at least one communications medium to the central unit. Each of the plurality of remote units further comprises a plurality of internal power paths each configured to carry power to a combined power node coupled to at least one remote unit load to provide a combined output power to the at least one remote unit load. Each of the plurality of remote units further comprises a plurality of input power ports provided in a respective internal power path among the plurality of internal power paths, each input power port among the plurality of input power ports configured to receive input power from a respective external power path in a DAS. Each of the plurality of remote units further comprises a plurality of isolation circuits provided in a respective internal power path among the plurality of internal power paths. Each isolation circuit among the plurality of isolation circuits is configured to receive the input power from a respective input power port and provide an electrically isolated output power based on the received input power at the combined power node to provide the combined output power. Each of the plurality of remote units further comprises a plurality of control circuits provided between the combined power node and the plurality of isolation circuits in a respective internal power path among the plurality of internal power paths. Each of the plurality of remote units further comprises a controller configured to selectively control an amount of electrically isolated output power delivered from the isolation circuit in the respective internal power path, to the combined power node into the combined output power.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification.

DETAILED DESCRIPTION

Various embodiments will be further clarified by the following examples.

Embodiments disclosed herein include combining of power from electrically isolated power paths for powering remote units in distributed antenna systems (DASs). In this regard, in one example, one or more remote units in a DAS include multiple input power ports for receiving power from multiple power paths. Each power path is capable of distributing a given maximum power based on its respective power supply and the power handling capability of the respective power path. The received power from each input power port in a remote unit is combined to provide a combined output power for powering the remote unit. In this manner, the remote unit can be powered by the combined output power if the remote unit requires more power for operation than can be supplied over a single power path. To avoid differences in received power on the multiple input power ports causing a power supply from providing higher power than designed or regulated, the input power ports in the remote unit are electrically isolated from each other. Further, in some embodiments, to provide for the received power on the multiple power inputs ports to be proportionally provided in the combined output power according to the maximum power supplying capabilities of the respective power supplies, a controller is provided. The controller is configured to selectively control the amount of power provided from each power input port to the combined output power, based on the determined available power on each multiple input power port.

By proportionally combining power from electrically isolated power paths in a remote unit based on the power supplying capability of the respective power supplies, the remote unit can tolerate inaccuracies in the output power from the power supplies. For example, the type and length of wires used in the power paths for delivering power to the power input ports of a remote unit can cause the remote unit to draw power beyond the limits or regulations of a given power supply. This can simplify installation procedures for power supplies and remote units in a DAS, because in-field calibrations of power supplies by technicians based on variations in power supplies and power paths may be avoided. The remote unit can work with multiple types of power supplies, which can have different power delivery capabilities or regulations.

Figure 1:
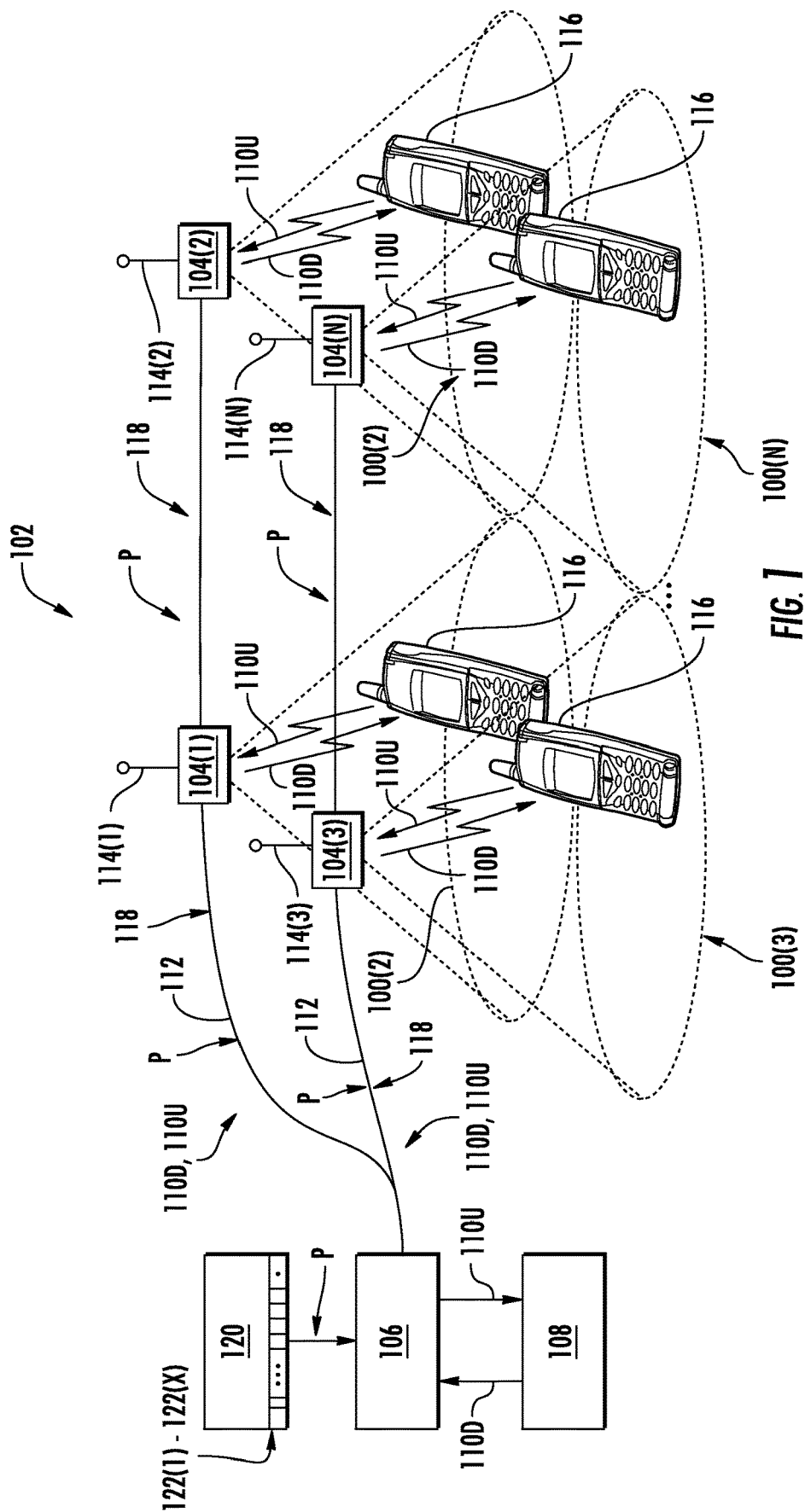
FIG. 1 is a schematic diagram of an exemplary distributed antenna system (DAS) capable of distributing radio frequency (RF) communications services to client devices.
Figure 2:
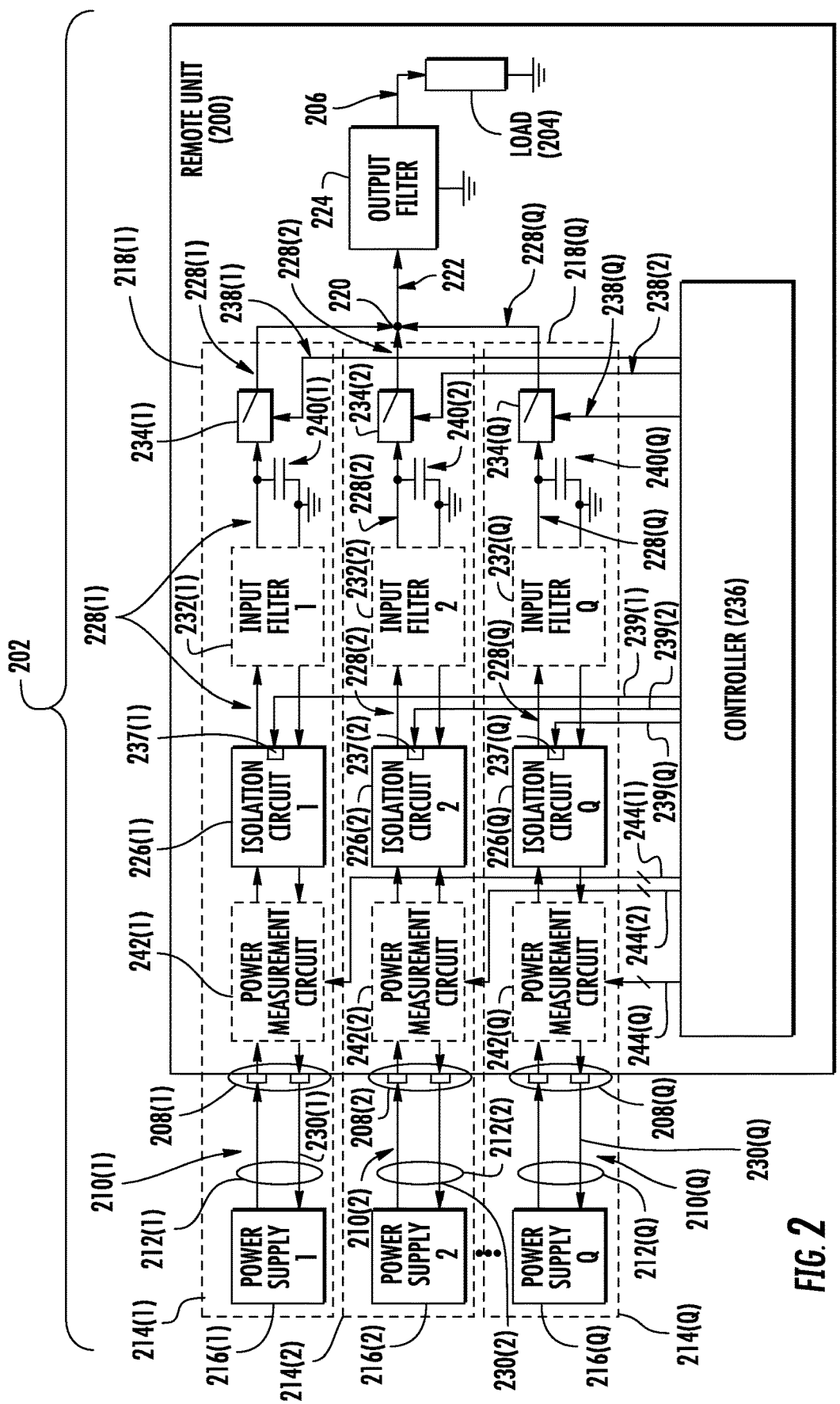
FIG. 2 is a schematic diagram of an exemplary remote unit that can be provided in a DAS, wherein the remote unit is configured to combine received power from electrically isolated power ports each receiving power from respective external power paths, for powering the remote unit.

In this regard, FIG. 2 is a schematic diagram of an exemplary remote unit 200 that can be provided in a DAS. Note that a plurality of the remote units 200 may be provided in a DAS. The remote unit 200 is configured to distribute communications services in a DAS 202. These communications services are provided by power-consuming components represented by a remote unit load 204 ("load 204") in FIG. 2. Note that the load 204 can represent multiple different loads in the remote unit 200. The remote unit 200 is configured to provide an output power 206 to the load 204 for operations. If the load 204 requires more power to operate than can be provided by a single power supply over a single power wire pair to the remote unit 200, the remote unit 200 can be configured to receive input power in multiple input power ports over multiple respective power paths in the DAS 202. In this regard, the remote unit 200 in FIG. 2 contains multiple input power ports 208(1)-208(Q). 'Q' signifies that any number of input power ports 208 desired can be provided in the remote unit 200. Each input power port 208(1)-208(Q) is configured to receive input power 210(1)-210(Q) from a respective power wire pair 212(1)-212(Q) from a respective external power path 214(1)-214(Q) in the DAS 202. Multiple power supplies 216(1)-216(Q) are provided in the DAS 202 to supply the input power 210(1)-210(Q) over the respective power wire pairs 212(1)-212(Q) in the external power path 214(1)-214(Q) to the remote unit 200. The power supplies 216(1)-216(Q) may be located at the remote unit 200 or remotely from the remote unit 200. Each external power path 214(1)-214(Q) is capable of distributing a given maximum input power 210(1)-210(Q) based on the respective power supply 216(1)-216(Q) and the power handling capability of the respective power wire pair 212(1)-212(Q). In this manner, the remote unit 200 is configured to receive the input power 210(1)-210(Q) from the multiple power supplies 216(1)-216(Q) in case the power needed to power the load 204 is greater than can be supplied by a single power supply 216 among the multiple power supplies 216(1)-216(Q). For example, there may be restrictions on the maximum power that can be supplied by a power supply over a power wire pair 212 to the remote unit 200.

With continuing reference to FIG. 2, the remote unit 200 includes a plurality of internal power paths 218(1)-218(Q) for routing the received input power 210(1)-210(Q) from the input power ports 208(1)-208(Q) to the load 204. Each of the internal power paths 218(1)-218(Q) are coupled to a combined power node 220 to provide a combined output power 222 for powering the load 204. In the remote unit 200 in FIG. 2, an output filter 224 is provided to filter the combined output power 222 into the output power 206 provided to the load 204.

To avoid differences in the received input power 210(1)-210(Q) on the multiple input power ports 208(1)-208(Q) causing a power supply 216(1)-216(Q) from providing higher power than designed or regulated, the input power ports 208(1)-208(Q) in the remote unit 200 are electrically isolated from each other. In this regard, a plurality of isolation circuits 226(1)-226(Q) are provided in respective internal power paths 218(1)-218(Q). For example, the isolation circuits 226(1)-226(Q) may be direct current (DC) to DC (DC-DC) converters if the input power 210(1)-210(Q) is DC input power to provide the output power 206 as electrically isolated DC output power. As another example, isolation circuits 226(1)-226(Q) may be alternating current (AC) to DC (AC-DC) converters if the input power 210(1)-210(Q) is AC input power to provide the output power 206 as electrically isolated DC output power. Each isolation circuit 226(1)-226(Q) is configured to receive the respective input power 210(1)-210(Q) from the respective input power port 208(1)-208(Q). Each isolation circuit 226(1)-226(Q) is further configured to provide a respective electrically isolated output power 228(1)-228(Q) to the combined power node 220. The electrically isolated output powers 228(1)-228(Q) received at the combined power node 220 are combined together to form the combined output power 222. The isolation circuits 226(1)-226(Q) are capable of providing stable electrically isolated output powers 228(1)-228(Q) to provide a stable combined output power 222. Also, by providing the isolation circuits 226(1)-226(Q) in the respective internal power paths 218(1)-218(Q), the input power 210(1)-210(Q) being higher from one or more power supplies 216(1)-216(Q) than other power supplies 216(1)-216(Q) on the return paths 230(1)-230(Q) of the respective power wire pairs 212(1)-212(Q) does not cause a greater amount of power to be pulled beyond the power supply capability limits of a respective power supply 216(1)-216(Q). Optional input filters 232(1)-232(Q) can be provided in respective internal power paths 218(1)-218(Q) to filter the electrically isolated output powers 228(1)-228(Q) before being provided to the combined power node 220.

The load 204 may not require the maximum amount of power that can be provided in the output power 206 from the contribution of the electrically isolated output powers 228(1)-228(Q) from the isolation circuits 226(1)-226(Q) to the combined power node 220. In this regard, a plurality of control circuits 234(1)-234(Q) can be provided in each internal power path 218(1)-218(Q), respectively. For example, the control circuits 234(1)-234(Q) may be switching circuits in the form of switches. An electronic controller 236 ("controller 236") is provided in the remote unit 200 that is configured to control operation of the control circuits 234(1)-234(Q) to control the amount of the electrically isolated output power 228(1)-228(Q) to be delivered and combined at the combined power node 220 in the combined output power 222. As non-limiting examples, the controller 236 may be a microcontroller, microprocessor, logic circuit, or other control circuit. In this regard, the controller 236 can selectively control the control circuits 234(1)-234(Q) to couple the electrically isolated output power 228(1)-228(Q) to the combined power node 220 or decouple the electrically isolated output power 228(1)-228(Q) from the combined power node 220. To selectively control the control circuits 234(1)-234(Q), the controller 236 is configured to provide a control signal 238(1)-238(Q) to each of the respective control circuits 234(1)-234(Q) to control the control circuits 234(1)-234(Q). As an example, the controller 236 can selectively control the control circuits 234(1)-234(Q) to provide different levels of combined output power 222 to the load 204 depending on the power needed by the load 204 for operation. The remote unit 200 may also be designed to only need to power certain portions of the load 204 based on operation of the remote unit 200.

Capacitor circuits 240(1)-240(Q) may be provided in each of the respective internal power paths 218(1)-218(Q) between the isolation circuits 226(1)-226(Q) and the control circuits 234(1)-234(Q) to store energy from the electrically isolated output power 228(1)-228(Q) to smooth out or average any power bursts of the electrically isolated output power 228(1)-228(Q). The capacitor circuits 240(1)-240(Q) may each be comprised of a single capacitor or network of capacitors.

Note that the isolation circuits 226(1)-226(Q) may have an adjustable output power input 237(1)-237(Q), in the form of a current limiter input or adjustable output voltage that can be set by the controller 236 according to adjustment signals 239(1)-239(Q). The adjustment signals 239(1)-239(Q) may be either analog or digital signals depending on the type of isolation circuits 226(1)-226(Q) employed. Using these current limiters or output voltage adjustment mechanisms, it is possible to limit the electrically isolated output power 228(1)-228(Q) delivered through each internal power path 218(1)-218(Q) to the maximum allowed combined output power 222. In case of voltage based adjustment mechanism for the isolation circuits 226(1)-226(Q), the current of the electrically isolated output power 228(1)-228(Q) of a specific isolation circuit 226 will increase or decrease depending on the voltage difference between the electrically isolated output power 228(1)-228(Q) of the specific isolation circuit 226 and the combined power node 220, divided by the resistance of the electrical path between these nodes. The series resistance includes both the respective input filter 232 and the control circuit 234 resistance. In case the resistance between an isolation circuit 226(1)-226(Q) and the combined power node 220 is too low, an additional series resistor (not shown) may be added to the output of the isolation circuits 226(1)-226(Q), to enable fine tuning of the output current or voltage of the electrically isolated output power 228(1)-228(Q).

Figure 3:
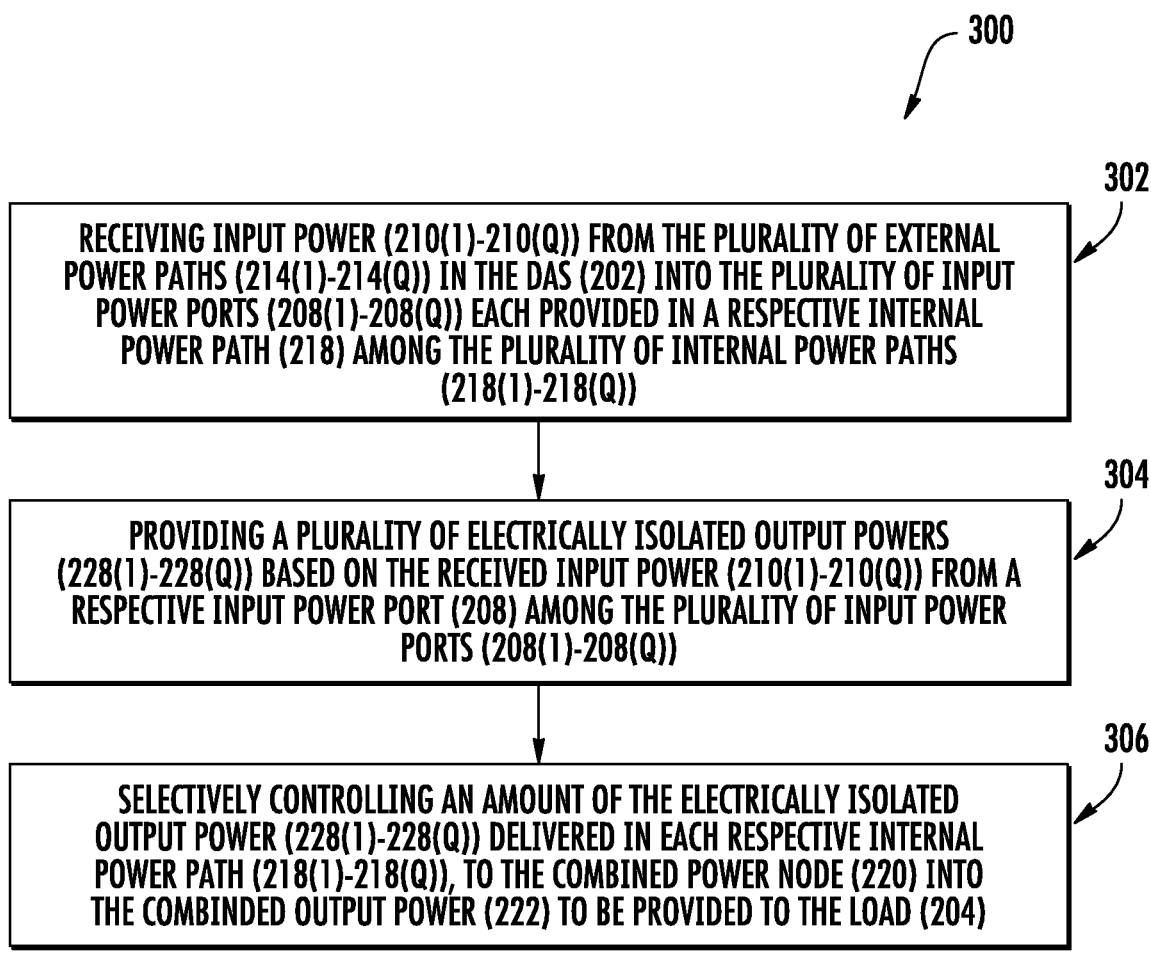
FIG. 3 is a flowchart illustrating an exemplary process of the remote unit in FIG. 2 receiving input power from a plurality of external power paths into a plurality of input power ports, and selectively controlling the contribution of power from each of the input power ports to a combined power node.

FIG. 3 is a flowchart illustrating an exemplary process 300 of the remote unit 200 in FIG. 2 receiving the input power 210(1)-210(Q) from input power ports 208(1)-208(Q) and selectively controlling the control circuits 234(1)-234(Q) to control contribution of each electrically isolated output power 228(1)-228(Q) to the combined output power 222 at the combined power node 220. In this regard, remote unit 200 receives the input power 210(1)-210(Q) from the external power paths 214(1)-214(Q) in the DAS 202 into the input power ports 208(1)-208(Q) each provided in a respective internal power path 218 among a plurality of internal power paths 218(1)-218(Q) (block 302). The isolation circuits 226(1)-226(Q) provide the electrically isolated output powers 228(1)-228(Q) based on the received input power 210(1)-210(Q) from a respective input power port 208 among the plurality of input power ports 208(1)-208(Q) (block 304). The controller 236 selectively controls an amount of the electrically isolated output power 228(1)-228(Q) delivered in each respective internal power path 218(1)-218(Q), to the combined power node 220 into the combined output power 222 to be provided to the load 204 (block 306).

It may also be desired to provide the combined output power 222 in the remote unit 200 in FIG. 2 according to the maximum power supplying capabilities of the power supplies 216(1)-216(Q). In this manner, it may be desired to provide electrically isolated output power 228(1)-228(Q) that is proportional to the power supplying capabilities of the power supplies 216(1)-216(Q). By proportionally combining electrically isolated output power 228(1)-228(Q) based on the power supplying capability of the respective power supplies 216(1)-216(Q), the remote unit 200 can tolerate inaccuracies in the output power from the power supplies 216(1)-216(Q). For example, if three (3) power supplies 216(1)-216(3) capable of providing a maximum power of 70, 80, and 90 Watts (W) respectively are provided to supply power to the remote unit 200, the maximum power available to be provided to the load 204 is 240 W (i.e., 70 W+80 W+90 W). The combined output power 222 can be provided as a proportion of electrically isolated output power 228(1)-228(3) in accordance with the relative maximum power supplying capabilities of the three (3) power supplies 216(1)-216(3).

Figure 4:
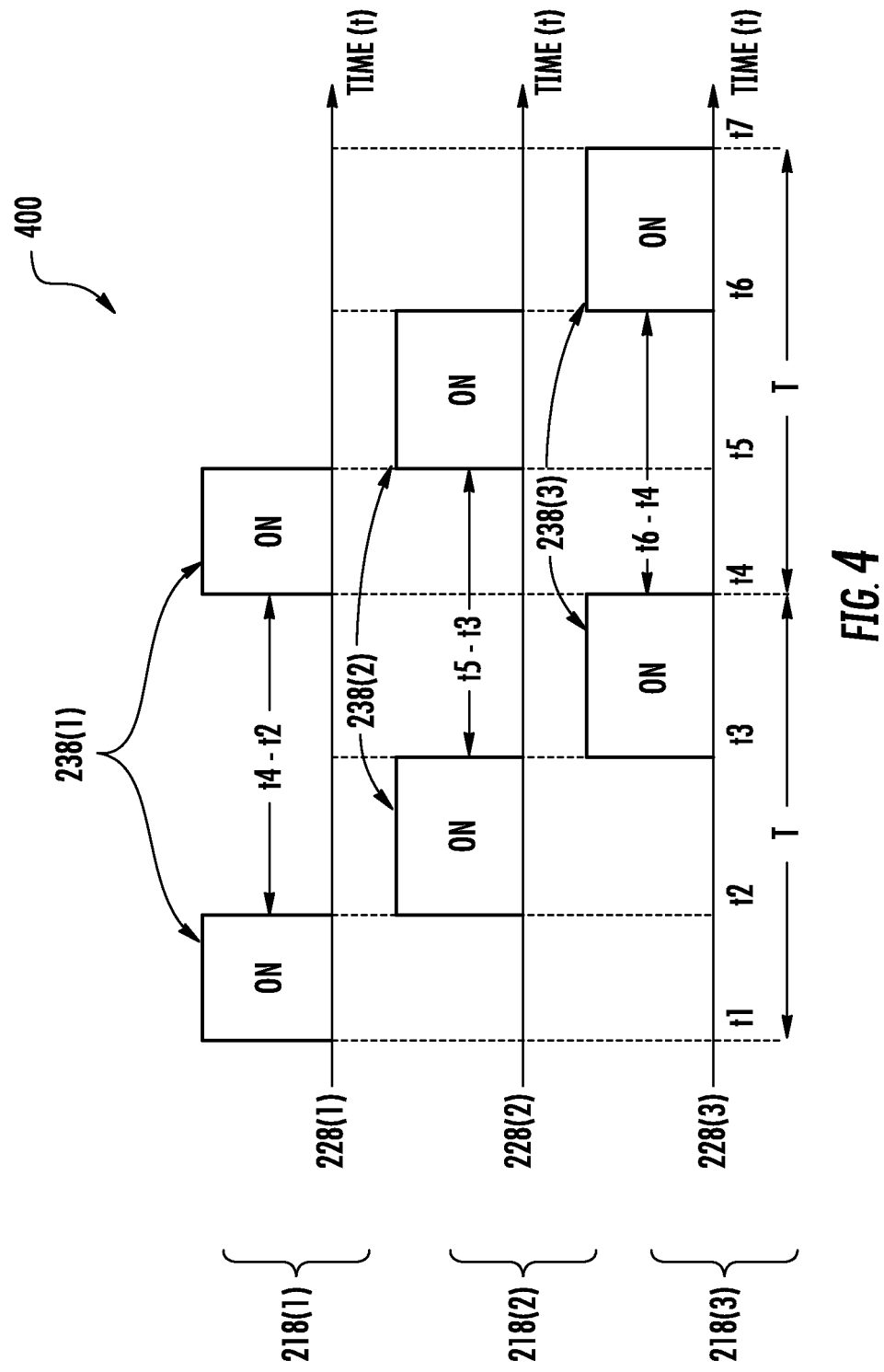
FIG. 4 is a timing diagram illustrating exemplary duty cycles of control circuits in each output power path in the remote unit in FIG. 2 controlling the portion of time that power received from a respective input power port is provided to a combined output power.

Thus, in this example, as shown in the timing diagram 400 in FIG. 4, the control circuits 234(1)-234(3) could be controlled to be turned on and turned off by the controller 236 to pulse width modulate (PWM) the electrically isolated output power 228(1)-228(3) in proportion to the power supplying capabilities of the respective power supplies 216(1)-216(3). As shown in FIG. 4, the three (3) electrically isolated output powers 228(1)-228(3) are pulse width modulated (PWM) by the controller 236 by controlling respective control circuits 234(1)-234(3). In this example, to PWM the electrically isolated output power 228(1)-228(3) in proportion to the power supplying capabilities of the respective power supplies 216(1)-216(3), the combined output power 222 at the combined power node 220 of the first electrically isolated output power 228(1) is PWM at 29.2% (i.e., 70 W/240 W). This is shown by time period t1 to t2 of period T in FIG. 4. The second electrically isolated output power 228(2) is PWM by the controller 236 at 33.3% (80 W/240 W). This is shown by time period t2 to t3 in period T in FIG. 4. The third electrically isolated output power 228(3) is PWM by the controller 236 at 37.5% (90 W/240 W) of time period T. This is shown by time period t3 to t4 in period T in FIG. 4.

In this regard, with reference to FIG. 2, the remote unit 200 additionally includes optional power measurement circuits 242(1)-242(Q) provided in each internal power path 218(1)-218(Q) to measure the power supplying capability of the power supplies 216(1)-216(Q) supplying power to the input power ports 208(1)-208(Q). In this manner, the relative power supplying capabilities of the power supplies 216(1)-216(Q) can be determined by the controller 236, to be able to proportionally control providing the electrically isolated output power 228(1)-228(Q) to the combined power node 220. The power measurement circuits 242(1)-242(Q) are provided between respective input power ports 208(1)-208(Q) and the isolation circuits 226(1)-226(Q) in the remote unit 200. The power measurement circuits 242(1)-242(Q) are configured to measure the available power provided to the input power ports 208(1)-208(Q) by the respective power supplies 216(1)-216(Q). The power measurement circuits 242(1)-242(Q) are further configured to provide the measured available power from the input power ports 208(1)-208(Q) to the controller 236.

In this regard, the controller 236 is configured to instruct the power measurement circuits 242(1)-242(Q) through control signals 244(1)-244(Q) to measure the available power that can be provided by the power supplies 216(1)-216(Q) to the respective input power ports 208(1)-208(Q). The power measurement circuits 242(1)-242(Q) may be configured to measure the maximum available power that can be provided by the power supplies 216(1)-216(Q) to the respective input power ports 208(1)-208(Q). As will be discussed in more detail below, the controller 236 can use the determined available power that can be provided by the power supplies 216(1)-216(Q) to selectively control the control circuits 234(1)-234(Q) to deliver the electrically isolated output power 228(1)-228(Q) to the combined power node 220 based on the available power that can be supplied by the respective power supplies 216(1)-216(Q). For example, the controller 236 may be configured to selectively control the control circuits 234(1)-234(Q) to proportionally deliver the electrically isolated output power 228(1)-228(Q) to the combined power node 220 based on the proportions of available power that can be supplied by the respective power supplies 216(1)-216(Q).

Figure 5:
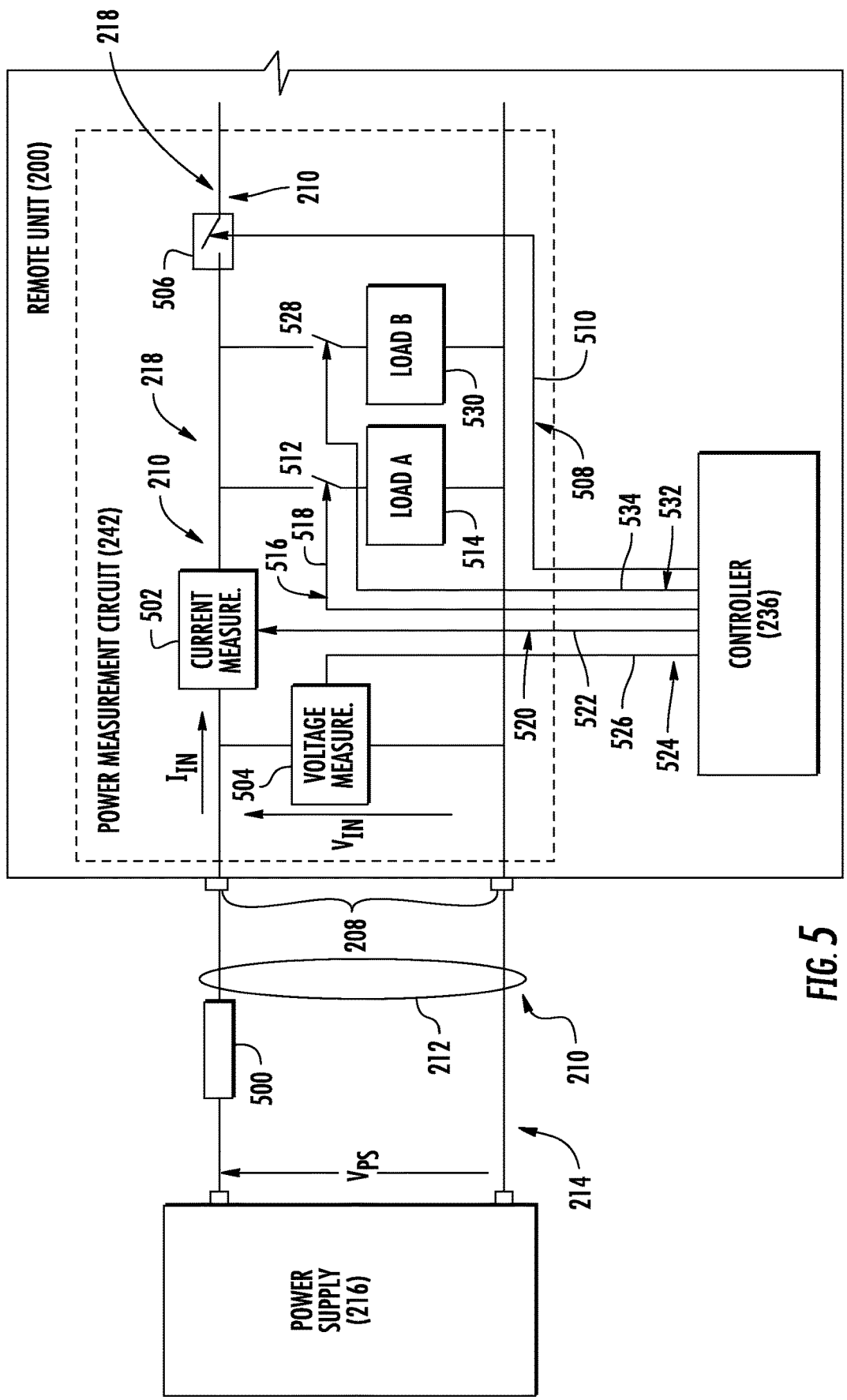
FIG. 5 is a schematic diagram illustrating more detail of an exemplary available power measurement circuit provided in the remote unit in FIG. 2 for measuring the available power from a power supply supplying power over an external power path to a respective input power port in the remote unit.

In this regard, FIG. 5 illustrates more exemplary detail of an exemplary power measurement circuit 242 provided in the remote unit 200 in FIG. 2. Only one power measurement circuit 242 is shown for one internal power path 218 in the remote unit 200 in FIG. 5 receiving the input power 210 from a corresponding power supply 216 for simplicity in illustration purposes only. However, it should be noted that a plurality of power measurement circuits 242(1)-242(Q) can be provided corresponding to each internal power path 218(1)-218(Q), as illustrated in FIG. 2. The power measurement circuit 242 is configured to measure the available power from a power supply 216 supplying the input power 210 over the external power path 214 to a respective input power port 208. In one example, as discussed above, power measurement circuit 242 is configured to measure the maximum available power from a power supply 216 supplying the input power 210 over the external power path 214 to a respective input power port 208.

With continuing reference to FIG. 5, the power supply 216 is electrically connected through power wire pair 212 to the remote unit 200 to provide the input power 210 to the input power port 208. The power wire pair 212 has a resistance represented by resistor (R) 500. To measure the available power of the power supply 216, the input current $I_{IN}$ of the input power 210 is measured by a current measurement circuit 502 in the power measurement circuit 242 of the remote unit 200. The input voltage $V_{IN}$ of the input power 210 is measured by a voltage measurement circuit 504 in the power measurement circuit 242. In order to calculate the available input power 210 from the power supply 216, the controller 236 can be configured to manage the measurement of the input current $I_{IN}$ and the input voltage $V_{IN}$ in the following exemplary available power measurement process 600 in FIG. 6A discussed below.

Figure 6A:
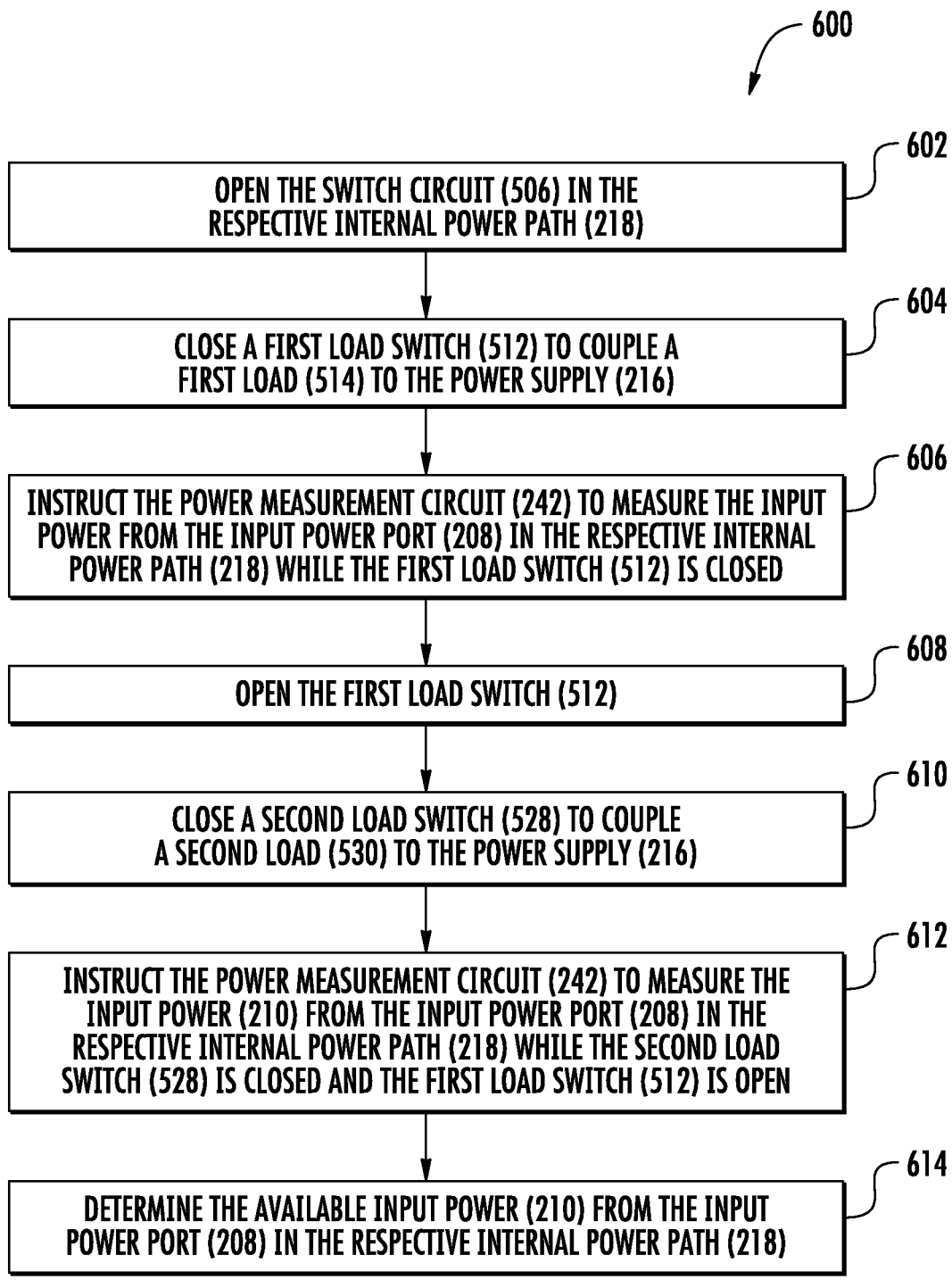
FIG. 6A is a flowchart illustrating an exemplary process of measuring the available power from a respective power supply supplying power over a respective external power path to a respective input power port in the remote unit.

With reference to FIG. 6A, the available power measurement process 600 begins with the controller 236 causing a switch circuit 506 in the respective internal power path 218 to temporarily disconnect the power measurement circuit 242 from any load, including a respective isolation circuit 226 and load 204 (see FIG. 2) (block 602). The controller 236 causes the switch circuit 506 to open by providing a switch control signal 508 on a switch control line 510 instructing the switch circuit 506 to open. Next, the controller 236 causes a first load switch 512 coupled to a first load (LOAD A) 514 to close to couple the first load 514 to the power supply 216 (block 604). The controller 236 causes the first load switch 512 to close by providing a switch control signal 516 on a switch control line 518 instructing the first load switch 512 to close. The controller 236 instructs the current measurement circuit 502 to measure the input power 210 on the input power port 208 with the first load 514 coupled to the power supply 216 by the first load switch 512 being closed (block 606). In this regard, the controller 236 provides a current measurement signal 520 on a current measurement line 522 to cause the current measurement circuit 502 to measure the input current $I_{IN}$ while the first load 514 is coupled to the power supply 216. The controller 236 also provides a voltage measurement signal 524 on a voltage measurement line 526 to cause the voltage measurement circuit 504 to measure the input voltage $V_{IN}$ while the first load 514 is coupled to the power supply 216.

With continuing reference to FIG. 6A, the controller 236 causes a switch control signal 516 on a switch control line 518 to instruct the first load switch 512 to open (block 608). Next, the controller 236 causes a second load switch 528 coupled to a second load (LOAD B) 530 to close to couple the second load 530 to the power supply 216 (block 610). The controller 236 causes the second load switch 528 to close by providing a switch control signal 532 on a switch control line 534 instructing the second load switch 528 to close. The controller 236 instructs the current measurement circuit 502 to measure the input power 210 on the input power port 208 with the second load 530 coupled to the power supply 216 by the second load switch 528 being closed (block 612). In this regard, the controller 236 provides the current measurement signal 520 on the current measurement line 522 to cause the current measurement circuit 502 to measure the input current $I_{IN}$ while the second load 530 is coupled to the power supply 216. The controller 236 also provides the voltage measurement signal 524 on the voltage measurement line 526 to cause the voltage measurement circuit 504 to measure the input voltage $V_{IN}$ while the second load 530 is coupled to the power supply 216. Based on the measured input current $I_{IN}$ and input voltage $V_{IN}$ for both the first load 514 and the second load 530 being coupled to the power supply 216, the following equations are created that can be solved for maximum available power from the power supply 216 (block 614):

$$V_{PS}=I_{IN\text{-}LOAD\ A}*RLINE+V_{IN\text{-}LOAD\ A}, \text{ for first load 514 (LOAD } A) \quad (1)$$

$$V_{PS}=I_{IN\text{-}LOAD\ B}*RLINE+V_{IN\text{-}LOAD\ B}, \text{ for second load 530 (LOAD } B) \quad (2)$$

Once the output voltage ($V_{PS}$) of power supply 216 and the resistance (R) of power wire pair 212 are known, the maximum input current $I_{IN[Max]}$ can be calculated by solving equations 1 and 2 above as:

$$I_{IN[Max]}=P_{O[MAX]}/V_{PS}. \quad (3)$$

where $P_{O[MAX]}$ is the maximum power allowed to be delivered by the power supply 216.

Then, the maximum input voltage $V_{IN}$ when the input power port 208 reaches the maximum input current $I_{IN[Max]}$ is calculated as:

$$V_{IN[@PS\text{-}MAX]}=V_{PS}-I_{IN[Max]}*RLINE \quad (4)$$

Thus, the maximum available power $P_{IN[MAX]}$ that can be provided by the power supply 216 can be calculated as:

$$P_{IN[Max]}=I_{IN[@PS\text{-}MAX]}*V_{IN[@PS\text{-}MAX]}$$

Thus, using the PWM example above, the duty cycle of each control circuit 234(1)-234(Q) in the remote unit 200 in FIG. 2 is defined as the ratio between on time and the period time T (see FIG. 4). The duty cycle ($DC_I$) of each control circuit 234(1)-234(Q) can be calculated as:

$$DC_I=P_{IN\text{-}Q[Max]}/(P_{IN\ LOAD\ A[Max]}+P_{in\ LOAD\ B[Max]}+ \ldots P_{IN\text{-}n[Max]})=P_{IN\text{-}Q[Max]}/P_{T\ Max},$$

where 'Q' is the number of internal power paths 218(1)-218(Q).

Thus, using the previous PWM example of three (3) power supplies 216(1)-216(3) discussed above with reference to FIG. 4, the duty cycle of each control circuit 234(1)-234(3) will be:

Duty cycle of control circuit 234(1): 70 W/240 W=0.2917.
Duty cycle of control circuit 234(2): 80 W/240 W=0.3333.
Duty cycle of control circuit 234(3): 90 W/240 W=0.3750.

It should be noted that for applications where the targeted power consumption from each of the power wire pairs 212(1)-212(Q) is based on a pre-defined balancing policy (i.e. different power consumption is requested), solving the above two equations (1) and (2) to get both the output voltage $V_{PS}$ and $R_{LINE}$ values is performed. The calculated output voltage $V_{PS}$ will be used in conjunction with the measured input current $I_{IN}$ to calculate the power consumption from the power supplies 216(1)-216(Q). The controller 236 can adjust the power consumption from each of the power wire pairs 212(1)-212(Q) to reach the targeted power consumption for the power supplies 216(1)-216(Q). There are two exemplary cases for determining the targeted power consumption for the power supplies 216(1)-216(Q):

in the case that the targeted power consumption includes the line power drop, the targeted power consumption is $P_{PS}=I_{IN}*V_{PS}$ for each power supply 216(1)-216(Q); and in the case that the targeted power consumption excludes the line power drop, the targeted power consumption is $P_{IN}=I_{IN}*V_{IN}$ for each power supply 216(1)-216(Q).

A given control circuit 234 in the remote unit 200 in FIG. 2 may be open at exactly the same time that the other control circuits 234 are closed. However, a short delay may be inserted between the on states of the control circuit 234(1)-234(Q) for avoiding a situation where two control circuits 234 are on at the same time.

When a given control circuit 234 delivers power $P_{ON}$ to the load 204 in a duty cycle (DC) portion of the time, the average power consumed at the input power ports 208(1)-208(Q) of a respective internal power path 218(1)-218(Q) is given by:

$$P_{Average}=P_{ON} \times DC_Q \quad (5)$$

In the maximal case, the average power $P_{Average[Max]}$ that can be consumed at the input power ports 208(1)-208(Q) of the respective internal power paths 218(1)-218(Q) is limited to $P_{IN-Q[Max]}$ that was calculated previously:

$$P_{Average[Max]}=P_{IN-Q[Max]} \quad (6)$$

Substituting equation 5 into equation 6 provides:

$$P_{Average[Max]}=P_{IN-Q[Max]}=P_{ON} \times DC_Q \quad (7)$$

And therefore, the maximum power that may be delivered to the load 204 in the remote unit 200 in each on time is given by:

$$P_{ON[Max]}=P_{IN-Q[Max]}/DC_Q \quad (8)$$

Since duty cycle ($DC_Q$) is defined as:

$$DC_Q=P_{IN-Q[Max]}/P_{T[Max]} \quad (9)$$

Then, by substituting equation 9 into equation 8, the maximum power that may be delivered by the power supply 216(1)-216(Q) for the load 204 in each on time is found to be:

$$P_{ON[Max]}=P_{IN-Q[Max]}/DC_Q=P_{IN-Q[Max]}/P_{IN-Q[Max]}/P_{T[Max]}=P_{T[Max]} \quad (10)$$

When the load 204 requires exactly the maximum available power $PT_{T[Max]}$, which is $P_{T[Max]}=240$ W in the previous example, then at each on time of each control circuit 234(1)-234(Q), the input power 210 that will be delivered to the load 204 will be $P_{ON[Max]}=P_{T[Max]}=240$ W. Input power port 208(1) will deliver average power of 70 W and a peak power of 240 W. Input power port 208(2) will deliver average power of 80 W and a peak power of 240 W. Input power port 208(3) will deliver average power of 90 W and a peak power of 240 W. The capacitor circuits 240(1)-240(Q) in each internal power path 218(1)-218(Q) can be used for averaging the power bursts that are sourced by the load 204 from each internal power path 218(1)-218(Q). During the off period, the capacitor circuits 240(1)-240(Q) are charged with energy (through the isolation circuits 226(1)-226(Q) of each internal power path 218(1)-218(Q)). During off times, the capacitor circuits 240(1)-240(Q) provide energy to the load 204 in addition to the input power 210(1)-210(Q) provided to the input power ports 208(1)-208(Q). Then, when the consumed power by the remote unit 200 is lower the maximum available power $P_{T[Max]}$, the input power 210(1)-210(Q) consumed from each input power port 208(1)-208(Q) will be proportionally lower than the maximum power that is allowed to be consumed through the internal power paths 218(1)-218(Q).

With reference back to FIG. 4, period time T can be determined according to the following considerations. When capacitor circuits 240(1)-240(Q) supplement the energy when the respective control circuit 234(1)-234(Q) is on (i.e., connected to the load 204), for on time toN, the voltage on the load 204 (FIG. 2) drops gradually. Assuming that a voltage drop of $\Delta V$ is allowed during on time $t_{ON}$, also assume a current of $I_C$ is consumed by the capacitor circuits 240(1)-240(Q) during discharge. The above mentioned parameters are related according to the well-known equation:

$$\Delta V = \frac{I_C \cdot t_{on}}{C} \quad (11)$$

where 'C' is the capacitance of a respective capacitor circuit 240(1)-240(Q).

Assuming that three (3) internal power paths 218(1)-218(3) are provided, and therefore $t_{ON}$ is approximately T/3, and assuming that a drop of $\Delta V$ is allowed when the control circuit 234 provides ⅔ of the load current $I_L$ during on time $t_{ON}$. Then, based on the above, the last equation may be re-written as:

$$\Delta V = \frac{I_L(2/3) \cdot (T/3)}{C} \quad (12)$$

$$T = \frac{\Delta V \cdot C \cdot 9}{2 \cdot I_L} \quad (13)$$

Now, assume that a capacitor circuit of 100 µF is used and voltage drop of $\Delta V=0.05$ Volts is allowed when the control circuit 234 provides ⅔ of the load current $I_L$ during on time $t_{ON}$, and assume that the maximum load current is $I_L=5$A. Substituting the above assumptions to equation 13 will provide the period duration T.

$$T = \frac{\Delta V \cdot C \cdot 9}{2 \cdot I_L} = \frac{0.05 \cdot 100 \cdot 10^{-6} \cdot 9}{2 \cdot 5} = 4.5 \text{ µSec}$$

In addition to the above analysis, the voltage of electrically isolated output power 228(1)-228(Q) as well as the resistance of the components on the output side of the respective internal power path 218(1)-218(Q) of the isolation circuits 226(1)-226(Q) may suffer from tolerance/variation due to limited component accuracy. In order to mitigate this variation, a monitoring process 620 in FIG. 6B may be employed to determine the duty cycle (DC) of the control circuit 234(1)-234(Q) to compensate for the inefficiencies in the isolation circuits 226(1)-226(Q). In this regard, after the remote unit 200 is powered on, the controller 236 uses the first load switch 512 to connect a minimum load, such as the first load 514, to a respective internal power path 218(1)-218(Q) and sets a default or uniform duty cycle of all control circuits 234(1)-234(Q) (block 622). The controller 236 then performs the available power supplying capability of the power supplies 216(1)-216(Q) according to the example above, and reduces the results to fit the available power to the efficiency of the isolation circuits 226(1)-226(Q) (block 624). Next, the controller 236 executes an initial determination of the duty cycle of each control circuit 234(1)-234(Q) as previously discussed (block 626). The controller 236 then instructs the power measurement circuits 242(1)-242(Q) to perform current and voltage measurements in each internal power path 218(1)-218(Q), as previously discussed (block 628).

Figure 6B:
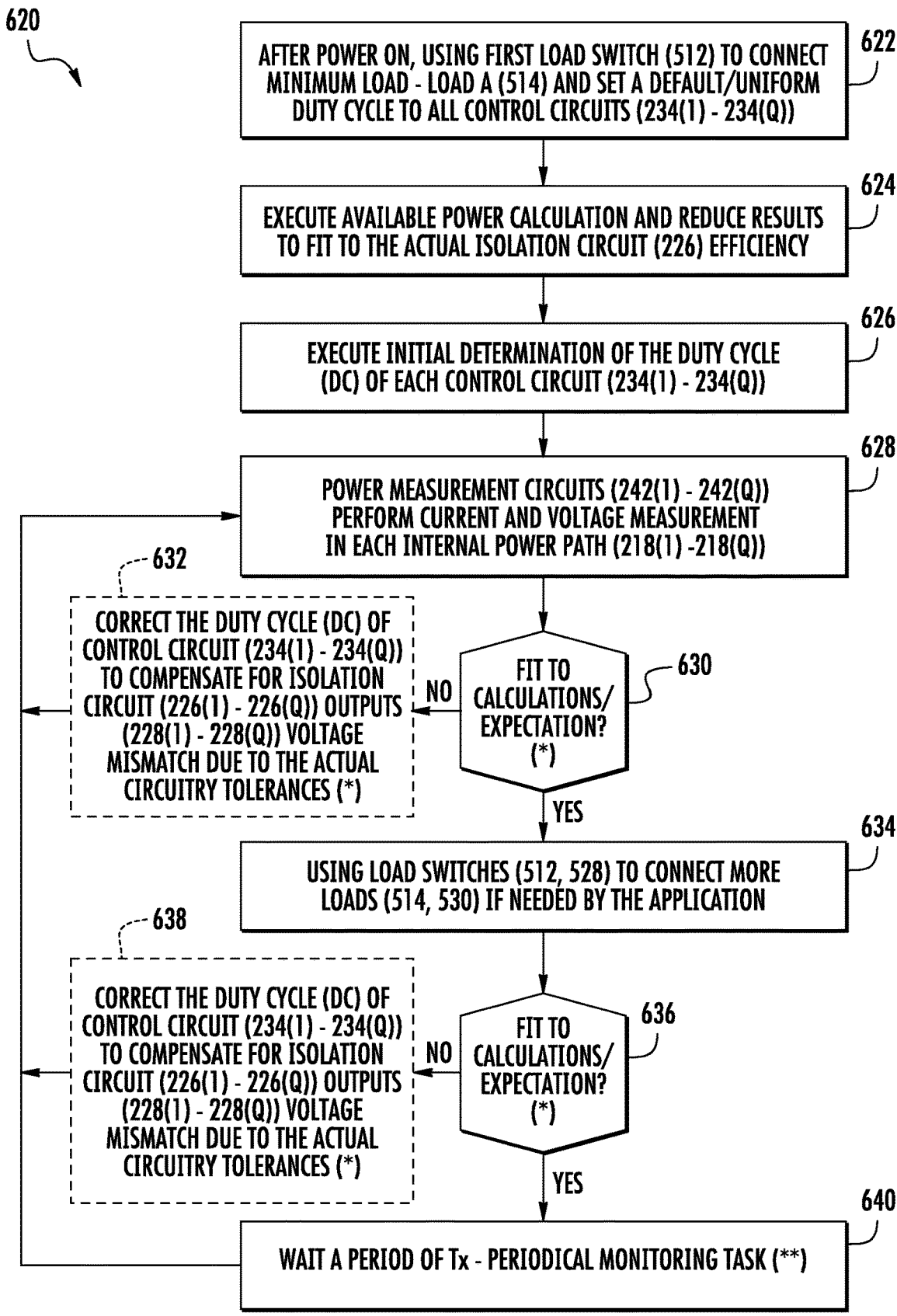
FIG. 6B is a flowchart illustrating an exemplary monitoring process of the remote unit in FIG. 2 determining isolation circuit intolerances to perform a correction process to compensate the output power for any such intolerances.

With continuing reference to FIG. 6B, the controller 236 determines if the fit to power measurement calculations meet expectations for the isolation circuits 226(1)-226(Q) (block 630). If not, the controller 236 may optionally correct the duty cycle of the control circuits 234(1)-234(Q) to compensate for the isolation circuits 226(1)-226(Q) voltage mismatches on the electrically isolated output powers 228(1)-228(Q) due to the actual circuitry intolerances (block 632). If controller 236 determines that the fit to power measurement calculations meet expectations for the isolation circuits 226(1)-226(Q), the controller 236 controls the first and second load switches 512, 528 to connect the first and second loads 514, 530 (or other loads) to the respective internal power paths 218(1)-218(Q), as previously discussed (block 634). The controller 236 then determines if the fit to power measurement calculations were to expectations for the isolation circuits 226(1)-226(Q) with the first and second loads 514, 530 connected (block 636). If not, the controller 236 again optionally corrects the duty cycle of the control circuits 234(1)-234(Q) to compensate for the isolation circuits 226(1)-226(Q) voltage mismatches on the electrically isolated output powers 228(1)-228(Q) due to the actual circuitry intolerances (block 638). If controller 236 determines that the fit to power measurement calculations meet expectations for the isolation circuits 226(1)-226(Q), the controller 236 waits a period of time (Tx) to repeat the monitoring process by retuning to block 708 (block 640).

Figure 7:
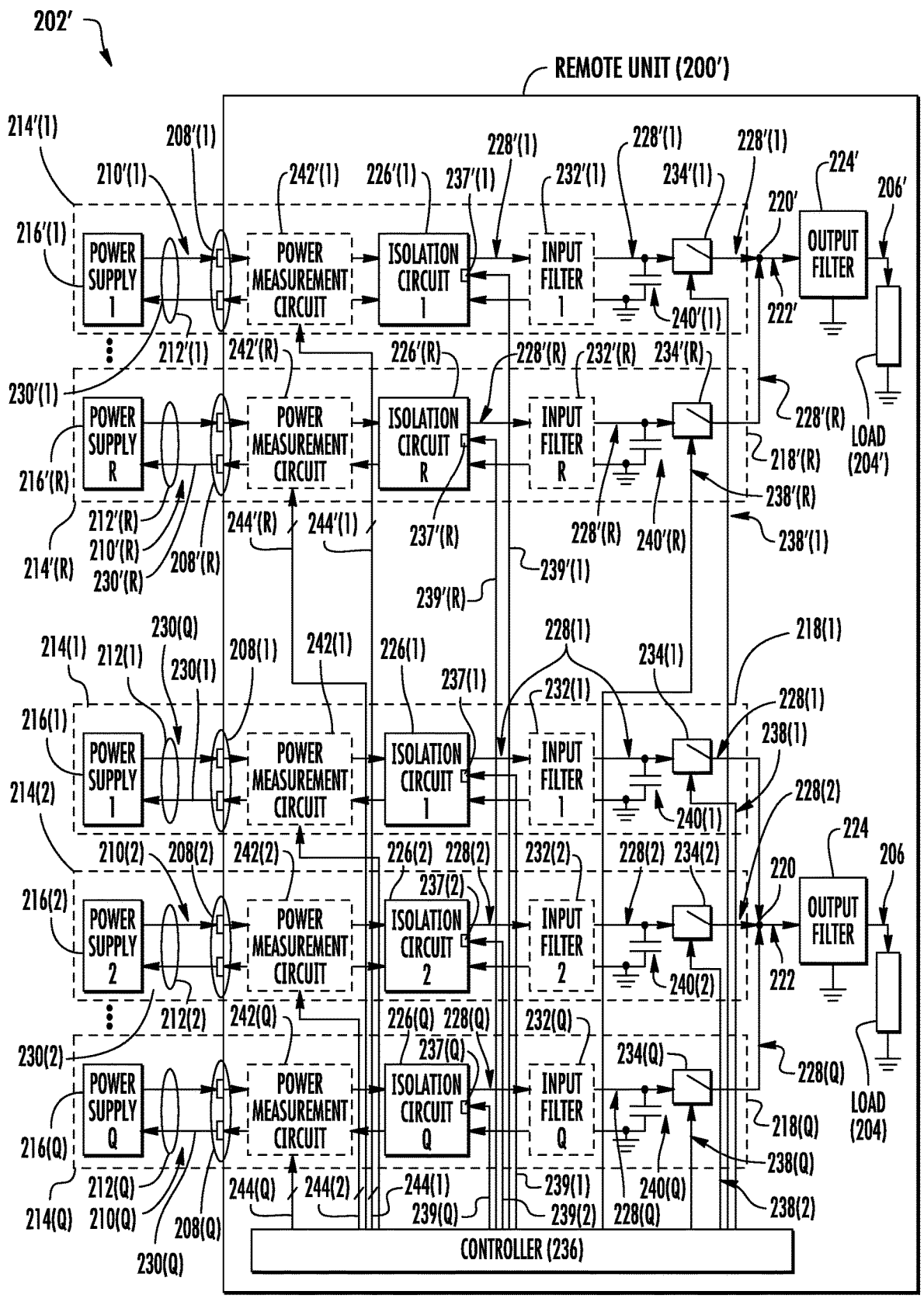
FIG. 7 is a schematic diagram of another exemplary remote unit that can be provided in a DAS, wherein the remote unit is configured to combine received power from electrically isolated power ports each receiving power from respective external power paths, to multiple output loads for powering the remote unit.

It is also possible to provide a remote unit that can be provided in a DAS, similar to the schematic diagram of FIG. 2 showing an exemplary remote unit 200 that can be provided in a DAS for combining power from isolated power paths for powering multiple loads in the remote units in distributed antenna systems (DASs). In this regard, FIG. 7 is a schematic diagram of another exemplary remote unit 200' that can be provided in the DAS 202', wherein the remote unit 200' is configured to combine received power from electrically isolated power ports each receiving power from respective external power paths, to multiple output loads for powering the remote unit 200'. The remote unit 200' is similar to the remote unit 200 in FIG. 2 in that the load 204 is included to receive an output power 206 based on received power from the power supplies 216(1)-216(Q) over internal power paths 218(1)-218(Q) that coupled to the combined power node 220 to provide a combined output power 222 for powering the load 204. In this regard, common elements between the remote unit 200 in FIG. 2 and the remote unit 200' in FIG. 7 are shown with common element numbers in FIGS. 2 and 7, and thus are not necessary to re-describe. However, the remote unit 200' also includes additional input power ports 208'(1)-208'(R) configured to receive power from power supplies 214'(1)-214'(R) to be electrically isolated and combined for providing power to an additional load 204'.

In this regard, the remote unit 200' in FIG. 7 contains multiple second input power ports 208'(1)-208'(R). 'R' signifies that any number of input power ports 208' desired can be provided in the remote unit 200'. Each second input power port 208'(1)-208'(R) is configured to receive second input power 210'(1)-210'(R) from a respective second power wire pair 212'(1)-212'(R) from a respective second external power path 214'(1)-214'(R) in the DAS 202'. The multiple second power supplies 216'(1)-216'(R) are provided in the DAS 202' to supply the second input power 210'(1)-210'(R) over the respective second power wire pairs 212'(1)-212'(R) in the second external power path 214'(1)-214'(R) to the remote unit 200'. The second power supplies 216'(1)-216'(R) may be located at the remote unit 200' or remotely from the remote unit 200'. Each second external power path 214'(1)-214'(R) is capable of distributing a given second maximum input power 210'(1)-210'(R) based on the respective second power supply 216'(1)-216'(R) and the power handling capability of the respective second power wire pair 212'(1)-212'(R). In this manner, the remote unit 200' is configured to receive the second input power 210'(1)-210'(R) from the multiple second power supplies 216'(1)-216'(R) in case the power needed to power the second, additional load 204' is greater than can be supplied by a single second power supply 216' among the multiple second power supplies 216'(1)-216'(R). For example, there may be restrictions on the maximum power that can be supplied by a power supply over a second power wire pair 212' to the remote unit 200'.

With continuing reference to FIG. 7, the remote unit 200' includes a plurality of second internal power paths 218'(1)-218'(R) for routing the received second input power 210'(1)-210'(R) from the second input power ports 208'(1)-208'(R) to the second load 204'. Each of the second internal power paths 218'(1)-218'(R) are coupled to a second combined power node 220' to provide a second combined output power 222' for powering the second load 204'. In the remote unit 200' in FIG., a second output filter 224' is provided to filter the second combined output power 222' into the second output power 206' provided to the second load 204'.

To avoid differences in the received second input power 210'(1)-210'(R) on the multiple second input power ports 208'(1)-208'(R) causing a second power supply 216'(1)-216'(R) from providing higher power than designed or regulated, the second input power ports 208'(1)-208'(R) in the remote unit 200' are electrically isolated from each other. In this regard, a plurality of second isolation circuits 226'(1)-226'(R) are provided in respective internal power paths 218'(1)-218'(R). For example, the second isolation circuits 226'(1)-226'(R) may be direct current (DC) to DC (DC-DC) converters if the second input power 210'(1)-210'(R) is DC input power to provide the second output power 206' as electrically isolated DC output power. As another example, second isolation circuits 226'(1)-226'(R) may be alternating current (AC) to DC (AC-DC) converters if the second input power 210'(1)-210'(R) is AC input power to provide the second output power 206' as electrically isolated DC output power. Each second isolation circuit 226'(1)-226'(R) is configured to receive the respective second input power 210'(1)-210'(R) from the respective second input power port 208'(1)-208'(R). Each second isolation circuit 226'(1)-226'(R) is further configured to provide a respective second electrically isolated output power 228'(1)-228'(R) to the second combined power node 220'. The second electrically isolated output powers 228'(1)-228'(R) received at the second combined power node 220' are combined together to form the second combined output power 222'. The second isolation circuits 226'(1)-226'(R) are capable of providing stable second electrically isolated output powers 228'(1)-228'(R) to provide a stable second combined output power

222'. Also, by providing the second isolation circuits 226'(1)-226'(R) in the respective second internal power paths 218'(1)-218'(R), the second input power 210'(1)-210'(R) being higher from one or more second power supplies 216'(1)-216'(R) than other second power supplies 216'(1)-216'(R) on the second return paths 230'(1)-230'(R) of the respective second power wire pairs 212'(1)-212'(R) does not cause a greater amount of power to be pulled beyond the power supply capability limits of a respective second power supply 216'(1)-216'(R). Optional second input filters 232'(1)-232'(R) can be provided in respective second internal power paths 218'(1)-218'(R) to filter the second electrically isolated output powers 228'(1)-228'(R) before being provided to the second combined power node 220'.

The second load 204' may not require the maximum amount of power that can be provided in the second output power 206' from the contribution of the second electrically isolated output powers 228'(1)-228'(R) from the second isolation circuits 226'(1)-226'(R) to the second combined power node 220'. In this regard, a plurality of second control circuits 234'(1)-234'(R) can be provided in each second internal power path 218'(1)-218'(R), respectively. For example, the second control circuits 234'(1)-234'(R) may be switching circuits in the form of switches. An electronic controller 236 ("controller 236") is provided in the remote unit 200' that is configured to control operation of the second control circuits 234'(1)-234'(R) to control the amount of the second electrically isolated output power 228'(1)-228'(R) to be delivered and combined at the second combined power node 220' in the second combined output power 222'. As non-limiting examples, the controller 236 may be a micro-controller, microprocessor, logic circuit, or other control circuit. In this regard, the controller 236 can selectively control the second control circuits 234'(1)-234'(R) to couple the second electrically isolated output power 228'(1)-228'(R) to the second combined power node 220' or decouple the second electrically isolated output power 228'(1)-228'(R) from the second combined power node 220'. To selectively control the second control circuits 234'(1)-234'(R), the controller 236 is configured to provide a second control signal 238'(1)-238'(R) to each of the respective second control circuits 234'(1)-234'(R) to control the control circuits 234'(1)-234'(R). As an example, the controller 236 can selectively control the control circuits 234'(1)-234'(R) to provide different levels of second combined output power 222' to the second load 204' depending on the power needed by the second load 204' for operation. The remote unit 200' may also be designed to only need to power certain portions of the second load 204' based on operation of the remote unit 200'.

Second capacitor circuits 240'(1)-240'(R) may be provided in each of the respective second internal power paths 218'(1)-218'(R) between the second isolation circuits 226'(1)-226'(R) and the second control circuits 234'(1)-234'(R) to store energy from the second electrically isolated output power 228'(1)-228'(R) to smooth out or average any power bursts of the second electrically isolated output power 228'(1)-228'(R). The second capacitor circuits 240'(1)-240'(R) may each be comprised of a single capacitor or network of capacitors.

Note that the second isolation circuits 226'(1)-226'(R) may have a second adjustable output power input 237'(1)-237'(R), in the form of a current limiter input or adjustable output voltage that can be set by the controller 236 according to second adjustment signals 239'(1)-239'(R). The second adjustment signals 239'(1)-239'(R) may be either analog or digital signals depending on the type of second isolation circuits 226'(1)-226'(R) employed. Using these current limiters or output voltage adjustment mechanisms, it is possible to limit the second electrically isolated output power 228'(1)-228'(R) delivered through each second internal power path 218'(1)-218'(R) to the maximum allowed second combined output power 222'. In case of voltage based adjustment mechanism for the second isolation circuits 226'(1)-226'(R), the current of the second electrically isolated output power 228'(1)-228'(R) of a specific second isolation circuit 226' will increase or decrease depending on the voltage difference between the second electrically isolated output power 228'(1)-228'(R) of the specific second isolation circuit 226' and the second combined power node 220', divided by the resistance of the electrical path between these nodes. The series resistance includes both the respective second input filter 232' and the control circuit 234' resistance. In case the resistance between a second isolation circuit 226'(1)-226'(R) and the second combined power node 220' is too low, an additional series resistor (not shown) may be added to the output of the second isolation circuits 226'(1)-226'(R), to enable fine tuning of the output current or voltage of the second electrically isolated output power 228'(1)-228'(R).

Note that each of the processes disclosed herein, including those discussed as being performed by the controller 236, can be performed for the second internal power paths 218'(1)-218'(R) to provide the second combined output power 222' to the second load 204'.

Figure 8:
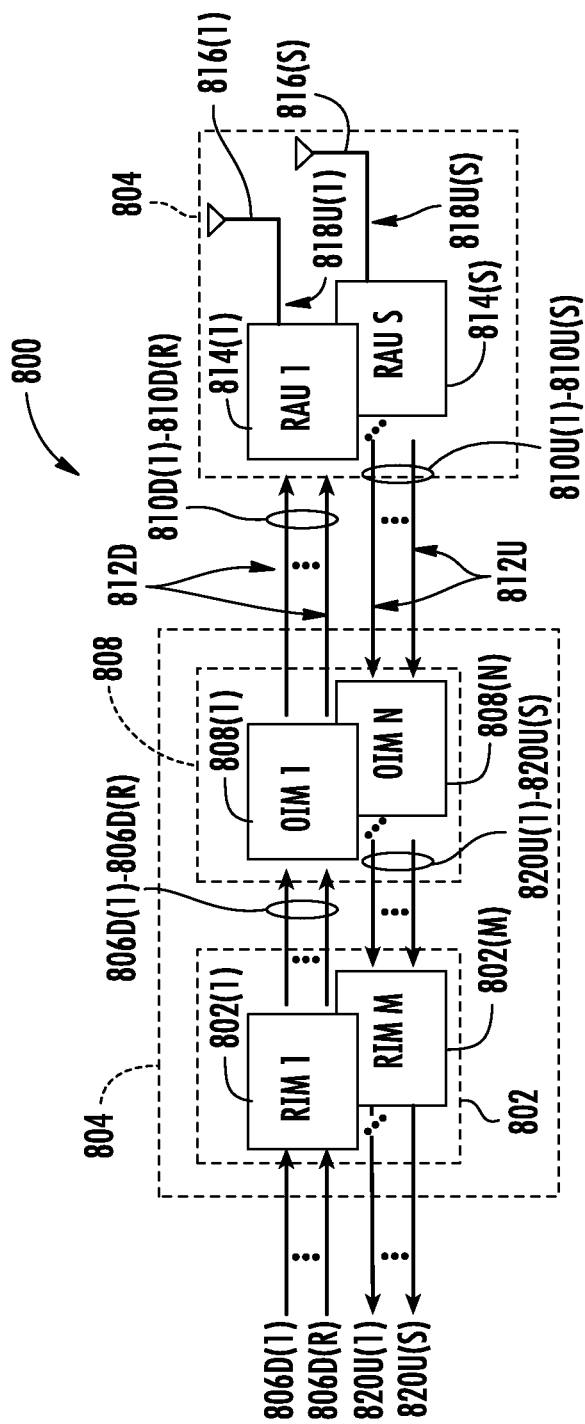
FIG. 8 is a schematic diagram of an exemplary DAS employing one or more remote units configured to combine received power from electrically isolated power ports each receiving power from respective power paths, for powering the remote unit.

FIG. 8 is a schematic diagram of an exemplary DAS 800 that can include remote units configured to combine received power from electrically isolated power ports each receiving power from respective power paths, for powering the remote unit. In this example, the DAS 800 is an optical fiber-based DAS. The DAS 800 includes optical fiber for distributing communications services for multiple frequency bands. The DAS 800 in this example is comprised of three(3) main components. One or more radio interfaces provided in the form of radio interface modules (RIMs) 802(1)-802(M) are provided in a central unit 804 to receive and process downlink electrical communications signals 806D(1)-806D(R) prior to optical conversion into downlink optical communications signals. The downlink electrical communications signals 806D(1)-806D(R) may be received from a base station (not shown) as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the plurality of RIMs 802(1)-802(M) as modular components that can easily be installed and removed or replaced in the central unit 804. In one example, the central unit 804 is configured to support up to twelve (12) RIMs 802(1)-802(12). Each RIM 802(1)-802(M) can be designed to support a particular type of radio source or range of radio sources (i.e., frequencies) to provide flexibility in configuring the central unit 804 and the DAS 800 to support the desired radio sources.

For example, one RIM 802 may be configured to support the Personal Communication Services (PCS) radio band. Another RIM 802 may be configured to support the 800 MHz radio band. In this example, by inclusion of these RIMs 802, the central unit 804 could be configured to support and distribute communications signals on both PCS and LTE 700 radio bands, as an example. RIMs 802 may be provided in the central unit 804 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 802(1)-802 (M) may also be provided in the central unit 804 that support any wireless technologies desired, including but not limited to Code Division Multiple Access (CDMA), CDMA 200, 1xRTT, Evolution-Data Only (EV-DO), UNITS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 802(1)-802(M) may be provided in the central unit 804 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink electrical communications signals 806D(1)-806D(R) are provided to a plurality of optical interfaces provided in the form of optical interface modules (OIMs) 808(1)-808(N) in this embodiment to convert the downlink electrical communications signals 806D(1)-806D(R) into downlink optical communications signals 810D(1)-810 D(R). The notation "1-N" indicates that any number of the referenced component 1-N may be provided. The OIMs 808 may be configured to provide one or more optical interface components (OICs) that contain optical to electrical (O/E) and electrical to optical (E/O) converters, as will be described in more detail below. The OIMs 808 support the radio bands that can be provided by the RIMs 802, including the examples previously described above.

The OIMs 808(1)-808(N) each include E/O converters to convert the downlink electrical communications signals 806D(1)-806D(R) into the downlink optical communications signals 810D(1)-810 D(R). The downlink optical communications signals 810D(1)-810 D(R) are communicated over downlink optical fiber communications medium 812D to a plurality of remote units 814(1)-814(S), which may be remote antenna units ("RAUs 814(1)-814(S)"). The notation "1-S" indicates that any number of the referenced component 1-S may be provided. O/E converters provided in the RAUs 814(1)-814(S) convert the downlink optical communications signals 810D(1)-810 D(R) back into the downlink electrical communications signals 806D(1)-806D(R), which are provided to antennas 816(1)-816(S) in the RAUs 814(1)-814(S) to client devices (not shown) in the reception range of the antennas 816(1)-816(S).

E/O converters are also provided in the RAUs 814(1)-814(S) to convert uplink electrical communications signals 818U(1)-818 U(S) received from client devices (not shown) through the antennas 816(1)-816 (S) into uplink optical communications signals 810U(1)-810U(S). The RAUs 814 (1)-814(S) communicate the uplink optical communications signals 810U(1)-810U(S) over an uplink optical fiber communications medium 812U to the OIMs 808(1)-808(N) in the central unit 804. The OIMs 808(1)-808(N) include O/E converters that convert the received uplink optical communications signals 810U(1)-810U(S) into uplink electrical communications signals 820U(1)-820 U(S), which are processed by the RIMs 802(1)-802(M) and provided as uplink electrical communications signals 820U(1)-820 U(S). The central unit 804 may provide the uplink electrical communications signals 820U(1)-820U(S) to a base station or other communications system.

Note that the downlink optical fiber communications medium 812D and uplink optical fiber communications medium 812 U connected to each RAU 814(1)-814(S) may be a common optical fiber communications medium, wherein for example, wave division multiplexing (WDM) may be employed to provide the downlink optical communications signals 810D(1)-810 D(R) and the uplink optical communications signals 810U(1)-810 U(S) on the same optical fiber communications medium.

Figure 9:
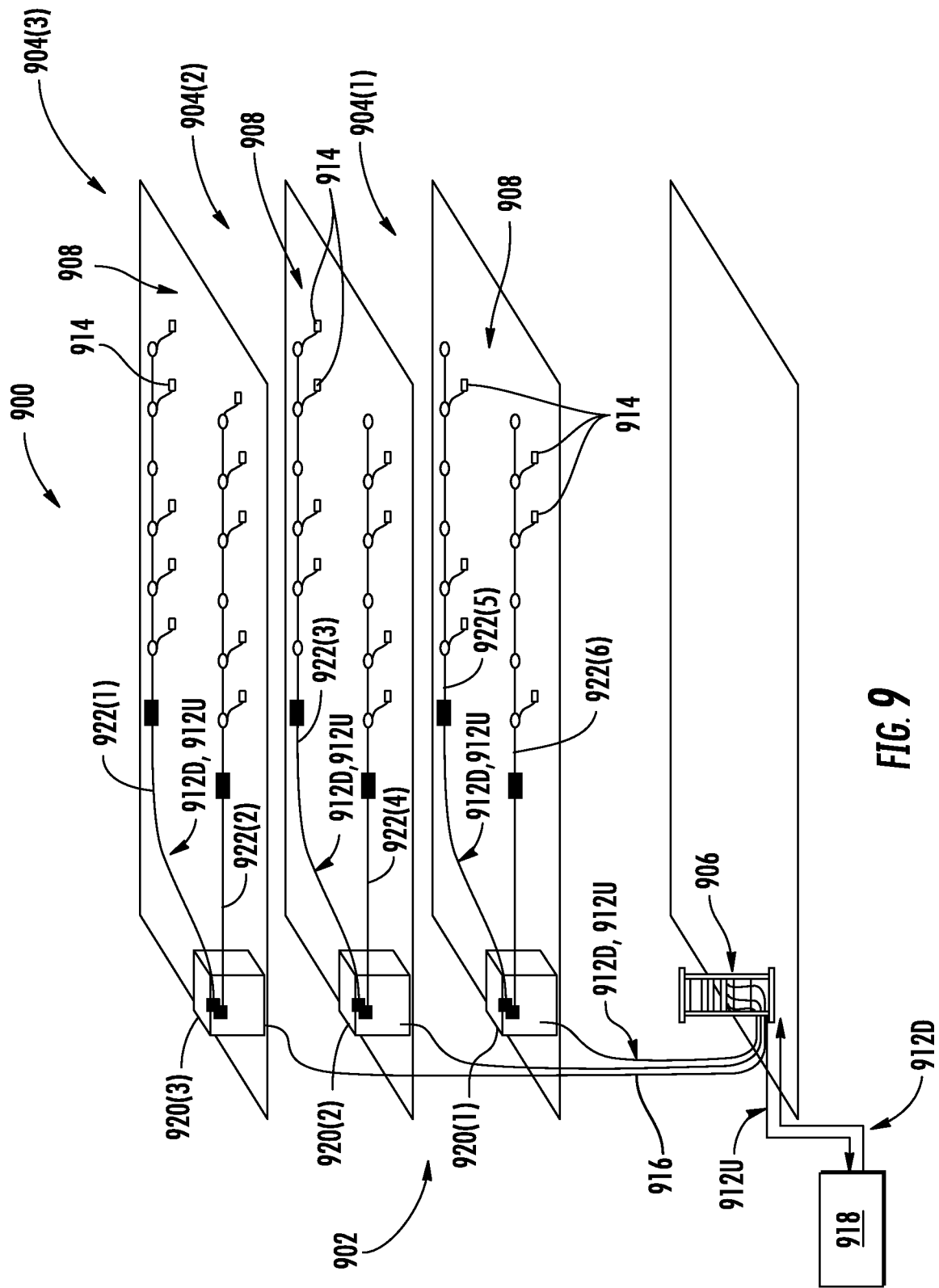
FIG. 9 is a partially schematic cut-away diagram of an exemplary building infrastructure in which a DAS can be employed, wherein one or more of the remote units is configured to combine received power from electrically isolated power ports each receiving power from respective external power paths, for powering the remote unit.

The DAS 800 in FIG. 8 that includes one or more RAUs 814 configured to combine received power from electrically isolated power ports each receiving power from respective power paths, for powering the remote unit, may be provided in an indoor environment. In this regard, FIG. 9 is a partially schematic cut-away diagram of a building infrastructure 900 employing a DAS 902 that includes one or more remote units configured to combine received power from electrically isolated power ports each receiving power from respective power paths, for powering the remote unit.

In this regard, the building infrastructure 900 in this example includes a first (ground) floor 904(1), a second floor 904(2), and a third floor 904(3). The floors 904(1)-904(3) are serviced by the central unit 906 to provide the antenna coverage areas 908 in the building infrastructure 900. The central unit 906 is communicatively coupled to the base station 910 to receive downlink communications signals 912 D from the base station 910. The central unit 906 is communicatively coupled to remote antenna units 914 to receive uplink communications signals 912 U from the remote antenna units 914. The remote antenna units 914 are configured to combine received power from electrically isolated power ports each receiving power from respective power paths, for powering the remote unit, including according to any of the exemplary examples discussed above. The downlink and uplink communications signals 912D, 912U communicated between the central unit 906 and the remote antenna units 914 are carried over a riser cable 916. The riser cable 916 may be routed through interconnect units (ICUs) 920(1)-920(3) dedicated to each floor 904(1)-904(3) that route the downlink and uplink communications signals 912D, 912U to the remote antenna units 914 and also provide power to the remote antenna units 914 via array cables 922(1)-922(6). The ICUs 920(1)-920(3) may contain power supplies that supply power over multiple power paths to the remote antenna units 914. Thus, the array cables 922(1)-922(6) may each include multiple power conductor pairs to provide multiple power paths for supplying power to the remote antenna units 914.

Figure 10:
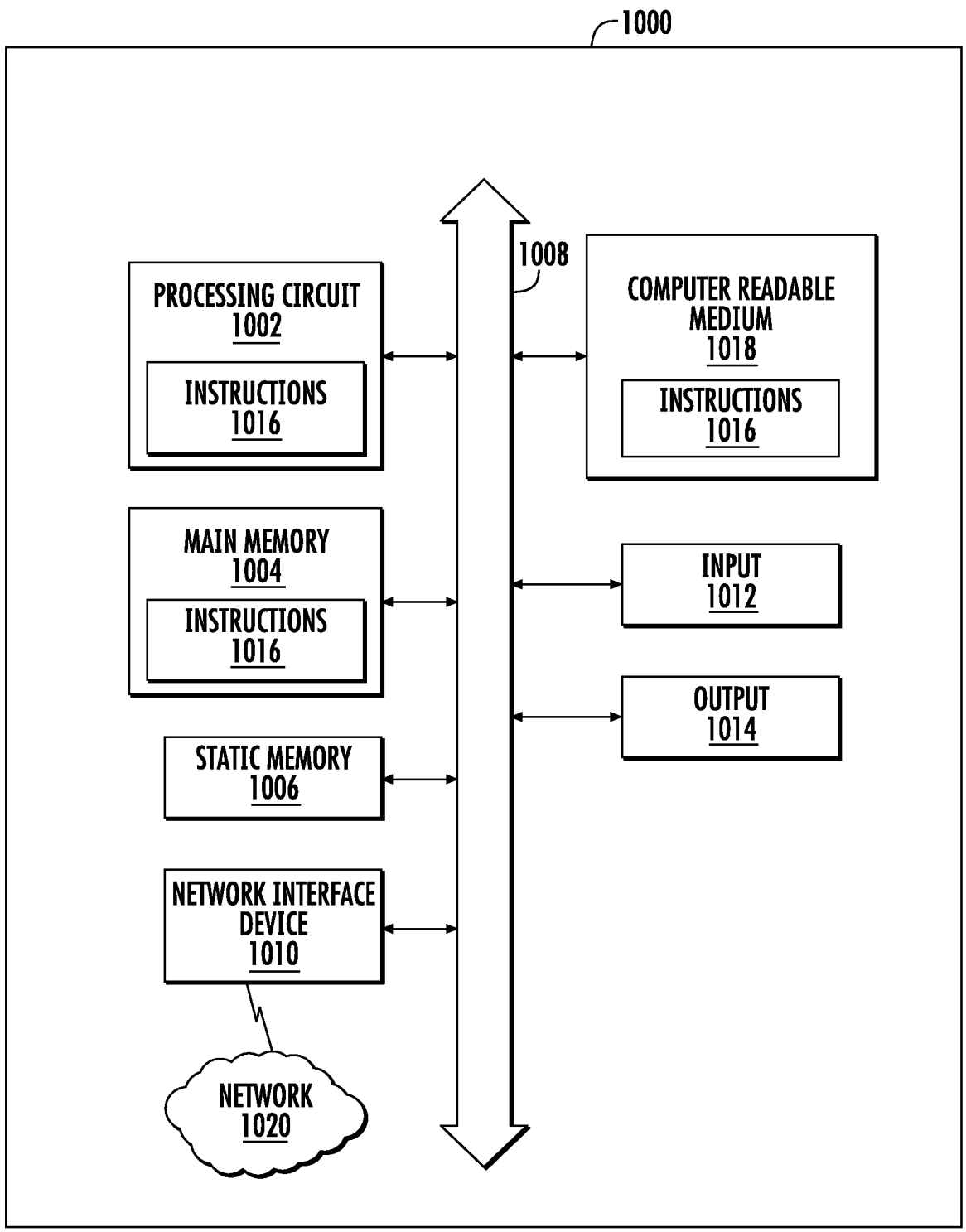
FIG. 10 is a schematic diagram of a generalized representation of an exemplary controller that can be included in a remote unit for measuring the available power from a power supply supplying power over a respective external power path to a respective input power port in the remote unit and/or proportionally controlling the contribution of power from each of the input power ports to the combined output power based on the measured available power from the respective power supplies, wherein the exemplary computer system is adapted to execute instructions from an exemplary computer readable medium.

FIG. 10 is a schematic diagram representation of additional detail illustrating a computer system 1000 that could be employed in the controllers discussed above, including but not limited to controller 236 in the remote unit 200 in FIG. 2. As discussed above, the controller 236 is configured to measure the available power from a power supply supplying power over a power path to a respective input power port in the remote unit 200, and proportionally control the contribution of power from each of the input power ports to the combined output power based on the measured available power from the respective power supplies. In this regard, the computer system 1000 is adapted to execute instructions from an exemplary computer-readable medium to perform these and/or any of the functions or processing described herein.

With reference to FIG. 10, the computer system 1000 may include a set of instructions that may be executed to predict frequency interference to avoid or reduce interference in a multi-frequency DAS. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing circuit ("processor 1002"), a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or static memory 1006 directly or via some other connectivity bus or connection. The processor 1002 may be a controller. The main memory 1004 and static memory 1006 may be any type of memory.

The processor 1002 may be a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A powered component comprising:
   a plurality of internal power paths each configured to carry power to a combined power node coupled to at least one component load to provide a combined output power to the at least one component load;
   a plurality of input power ports provided in a respective internal power path among the plurality of internal power paths, each input power port among the plurality of input power ports configured to receive input power from a respective external power path in a communications system;
   a plurality of power measurement circuits configured to:
      measure available power from each input power port among the plurality of input ports in a respective internal power path among the plurality of internal power paths; and
      provide the measured available power from the input power port in the respective internal power path;
   a plurality of control circuits configured to control an electrically isolated output power provided to the combined power node; and
   a controller configured to, for each respective internal power path among the plurality of internal power paths:
      instruct the power measurement circuit to measure the available power from the input power port;
      determine the measured available power from the input power port in the respective internal power path; and
      control the plurality of control circuits to control an amount of the electrically isolated output power delivered in each respective internal power path to the combined power node into the combined output power based on the measured available power from the input power port in the respective internal power path.

2. The powered component of claim 1, further comprising at least one filter in a respective internal power path among the plurality of internal power paths, the at least one filter configured to filter the electrically isolated output power.

3. The powered component of claim 2, further comprising at least one output filter and at least one isolation circuit disposed in series between at least one of the plurality of power measurement circuits and the at least one output filter.

4. The powered component of claim 2, wherein the controller is further configured to proportionally control the amount of the electrically isolated output power delivered in the respective internal power path to the combined power node into the combined output power based on the measured available power from the input power port in the respective internal power path.

5. A powered component comprising:
   a plurality of internal power paths configured to carry power to a combined power node coupled to at least one load to provide a combined output power to the at least one load;

a plurality of input power ports provided in a respective internal power path among the plurality of internal power paths, each input power port among the plurality of input power ports configured to receive input power from a respective external power path;

a plurality of isolation circuits provided in a respective internal power path among the plurality of internal power paths, each isolation circuit among the plurality of isolation circuits configured to:
- receive the input power from the respective input power port; and
- provide an electrically isolated output power based on the received input power at the combined power node to provide the combined output power;

a plurality of power measurement circuits in a respective internal power path among the plurality of internal power paths, each power measurement circuit among the plurality of power measurement circuits configured to:
- measure a maximum available power that can be provided by at least one power supply to the input power port in the respective internal power path; and
- provide the measured maximum available power from the input power port in the respective internal power path;

a plurality of control circuits provided in a respective internal power path among the plurality of internal power paths to control the electrically isolated output power provided to the combined power node, wherein the plurality of control circuits comprises a plurality of switches provided between the combined power node and the plurality of isolation circuits in a respective internal power path among the plurality of internal power paths; and a controller configured to:
- selectively control the plurality of switches to control the amount of electrically isolated output power coupled from each isolation circuit in the respective internal power path to the combined power node;
- instruct the power measurement circuit to measure the maximum available power from the input power port;
- determine the measured maximum available power from the input power port in the respective internal power path based on the maximum available power measured by the power measurement circuit; and
- control the plurality of control circuits to control the amount of the electrically isolated output power delivered from each isolation circuit in the respective internal power path, to the combined power node into the combined output power, based on the measured maximum available power from the input power port in the respective internal power path.

6. The powered component of claim 5, wherein the controller is configured to selectively control the plurality of switches to selectively pulse width modulate the electrically isolated output power from the isolation circuit in the respective internal power path to the combined power node.

7. The powered component of claim 5, wherein the controller is further configured to proportionally control the amount of electrically isolated output power delivered from each isolation circuit in the respective internal power path to the combined power node into the combined output power, based on the measured maximum available power from the input power port in the respective internal power path.

8. The powered component of claim 5, wherein each of the plurality of isolation circuits further comprises an output power adjustment input, and the controller is configured to selectively adjust the amount of electrically isolated output power by being configured to provide an adjustment signal to each output power adjustment input of the plurality of isolation circuits to adjust the electrically isolated output power.

9. The powered component of claim 5, further comprising a plurality of input filters provided between the isolation circuit and the combined power node in a respective internal power path among the plurality of internal power paths, each input filter among the plurality of input filters configured to filter the electrically isolated output power.

10. The powered component of claim 5, further comprising a plurality of capacitor circuits provided between the isolation circuit and the combined power node in a respective internal power path among the plurality of internal power paths, each capacitor circuit among the plurality of capacitor circuits configured to store energy from the electrically isolated output power from the respective isolation circuit to average power bursts of the electrically isolated output power.

11. A powered component comprising:
a plurality of internal power paths each configured to carry power to a combined power node coupled to at least one component load to provide a combined output power to the at least one component load;

a plurality of input power ports provided in a respective internal power path among the plurality of internal power paths, each input power port among the plurality of input power ports configured to receive input power from a respective external power path in a communications system;

a plurality of isolation circuits provided in a respective internal power path among the plurality of internal power paths, each isolation circuit among the plurality of isolation circuits configured to:
- receive the input power from the respective input power port; and
- provide an electrically isolated output power based on the received input power at the combined power node to provide the combined output power;

a plurality of power measurement circuits provided in a respective internal power path among the plurality of internal power paths, each power measurement circuit among the plurality of power measurement circuits configured to:
- measure a maximum available power that can be provided by at least one power supply to the input power port in the respective internal power path; and
- provide the measured maximum available power from the input power port in the respective internal power path;

a plurality of control circuits provided in a respective internal power path among the plurality of internal power paths to control the electrically isolated output power provided to the combined power node, wherein the plurality of control circuits comprises a plurality of switches provided between the combined power node and the plurality of isolation circuits in a respective internal power path among the plurality of internal power paths; and a controller configured to, for each respective internal power path among the plurality of internal power paths:
- control the plurality of switches to control the amount of electrically isolated output power coupled from each isolation circuit in the respective internal power path to the combined power node;

instruct the power measurement circuit to measure the maximum available power from the input power port;

determine the measured maximum available power from the input power port in the respective internal power path based on the maximum available power measured by the power measurement circuit; and control the plurality of control circuits to control the amount of the electrically isolated output power delivered from each isolation circuit in the respective internal power path, to the combined power node into the combined output power.

12. The powered component of claim 11, wherein the controller is configured to selectively control the plurality of switches to selectively pulse width modulate the electrically isolated output power from the isolation circuit in the respective internal power path to the combined power node.

13. The powered component of claim 11, wherein the controller is further configured to proportionally control the amount of electrically isolated output power delivered from each isolation circuit in the respective internal power path to the combined power node into the combined output power, based on the measured maximum available power from the input power port in the respective internal power path.

14. The powered component of claim 11, wherein each of the plurality of isolation circuits further comprises an output power adjustment input, and the controller is configured to selectively adjust the amount of electrically isolated output power by being configured to provide an adjustment signal to each output power adjustment input of the plurality of isolation circuits to adjust the electrically isolated output power.

15. The powered component of claim 11, wherein:
the plurality of internal power paths are each configured to carry the input power comprising direct current (DC) input power; and
the plurality of isolation circuits are comprised of a plurality of DC-DC converters configured to:
receive the DC input power from the respective input power port; and
provide the electrically isolated output power comprising electrically isolated DC output power based on the received DC input power to the combined power node to provide the combined output power comprising combined DC power.

16. A powered component comprising:
a plurality of internal power paths each configured to carry power to a combined power node coupled to at least one component load to provide a combined output power to the at least one component load;
a plurality of input power ports, each input power port among the plurality of input power ports configured to receive input power from a respective external power path in a communications system;
a plurality of power measurement circuits, each power measurement circuit among the plurality of power measurement circuits configured to:
measure available power from each input power port among the plurality of input ports in a respective internal power path among the plurality of internal power paths; and
provide the measured available power from the input power port in the respective internal power path;
a plurality of control circuits in a respective internal power path among the plurality of internal power paths to control an electrically isolated output power provided to the combined power node; and
a controller configured to, for each respective internal power path among the plurality of internal power paths:
instruct the power measurement circuit to measure the available power from the input power port;
determine the measured available power from the input power port in the respective internal power path based on the available power measured by the power measurement circuit; and
selectively control the plurality of control circuits to control an amount of the electrically isolated output power delivered in each respective internal power path to the combined power node into the combined output power based on the measured available power from the input power port in the respective internal power path.

17. The powered component of claim 16, further comprising at least one filter in a respective internal power path among the plurality of internal power paths, the at least one filter configured to filter the electrically isolated output power.

18. The powered component of claim 17, wherein the controller is further configured to proportionally control the amount of the electrically isolated output power delivered in the respective internal power path to the combined power node into the combined output power based on the measured available power from the input power port in the respective internal power path.

* * * * *